US011395203B2

(12) United States Patent
Logothetis et al.

(10) Patent No.: US 11,395,203 B2
(45) Date of Patent: Jul. 19, 2022

(54) TRANSMISSION ADJUSTMENT WITHIN A WIRELESS NETWORK FOR A MOVING VEHICLE

(71) Applicant: AIRSPAN IP HOLDCO LLC, Boca Raton, FL (US)

(72) Inventors: Andrew Logothetis, Buckinghamshire (GB); Marlon Peter Persaud, Buckinghamshire (GB); Krzysztof Dudzinski, Berkshire (GB); Venkateswarlu Katepalli, Berkshire (GB); Ashvtosh Goel, Berkshire (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 31 days.

(21) Appl. No.: 16/814,558

(22) Filed: Mar. 10, 2020

(65) Prior Publication Data

US 2020/0296644 A1    Sep. 17, 2020

(30) Foreign Application Priority Data

Mar. 11, 2019   (GB) ..................................... 1903217
Apr. 12, 2019   (GB) ..................................... 1905222
Sep. 5, 2019    (GB) ..................................... 1912797

(51) Int. Cl.
*H04W 4/00*         (2018.01)
*H04W 36/08*        (2009.01)
(Continued)

(52) U.S. Cl.
CPC .............. *H04W 36/08* (2013.01); *H04B 7/01* (2013.01); *H04B 7/18506* (2013.01);
(Continued)

(58) Field of Classification Search
CPC . H04W 36/14; H04W 36/0061; H04W 36/32; H04W 36/00835
See application file for complete search history.

(56) References Cited

U.S. PATENT DOCUMENTS 5,703,595 A    12/1997   Tayloe et al.
8,547,277 B1   10/2013   Mitchell
(Continued)

FOREIGN PATENT DOCUMENTS

CN      107306428 B     2/2020
EP      2214328 A2      8/2010
(Continued)

OTHER PUBLICATIONS

Application No. GB1903217.6—Search report dated Feb. 3, 2020.
(Continued)

*Primary Examiner* — Omoniyi Obayanju
(74) *Attorney, Agent, or Firm* — Haynes Beffel & Wolfeld LLP; Andrew Dunlap

(57) ABSTRACT

An apparatus is described, comprising circuitry to obtain base station location information for a plurality of base stations that provide a wireless network for communication with a moving vehicle, the plurality of base stations comprising a current base station and one or more other base stations, circuitry to obtain moving vehicle tracking information for the moving vehicle, circuitry to determine, based on the moving vehicle tracking information and the base station location information, transmission adjustment control information associated with each other base station, and an interface configured to transmit, for reception by the moving vehicle, the transmission adjustment control information associated with at least a selected other base station, to enable the moving vehicle to adjust a signal transmitted to the selected other base station when a handover procedure is performed to transition communication with the moving
(Continued)

vehicle from the current base station to the selected other base station.

21 Claims, 30 Drawing Sheets

(51) Int. Cl.
| | |
|---|---|
| *H04W 4/029* | (2018.01) |
| *H04W 4/40* | (2018.01) |
| *H04W 36/00* | (2009.01) |
| *H04W 48/16* | (2009.01) |
| *H04W 64/00* | (2009.01) |
| *H04B 7/01* | (2006.01) |
| *H04B 7/185* | (2006.01) |
| *H04W 36/32* | (2009.01) |
| *H04W 74/08* | (2009.01) |
| *H04W 92/20* | (2009.01) |

(52) U.S. Cl.
CPC ............. *H04W 4/029* (2018.02); *H04W 4/40* (2018.02); *H04W 36/0022* (2013.01); *H04W 36/0055* (2013.01); *H04W 36/32* (2013.01); *H04W 48/16* (2013.01); *H04W 64/003* (2013.01); *H04W 64/006* (2013.01); *H04W 74/0833* (2013.01); *H04W 92/20* (2013.01)

(56) References Cited

U.S. PATENT DOCUMENTS

| | | | |
|---|---|---|---|
| 8,599,956 | B1 | 12/2013 | Mitchell |
| 2006/0239238 | A1* | 10/2006 | Fernandez-Corbaton .................. H04W 52/325 370/342 |
| 2007/0021121 | A1 | 1/2007 | Lane et al. |
| 2007/0021122 | A1 | 1/2007 | Lane et al. |
| 2007/0161347 | A1* | 7/2007 | Ma .................... H04B 7/18506 455/11.1 |
| 2013/0143503 | A1 | 6/2013 | Li et al. |
| 2014/0094217 | A1 | 4/2014 | Stafford |
| 2015/0319668 | A1 | 11/2015 | Guo |
| 2016/0173162 | A1 | 6/2016 | Lundstedt et al. |
| 2017/0127332 | A1 | 5/2017 | Axmon et al. |
| 2018/0084562 | A1 | 3/2018 | Ramamurthi et al. |
| 2018/0206133 | A1 | 7/2018 | Venkatraman et al. |
| 2018/0338222 | A1 | 11/2018 | Manepalli et al. |
| 2019/0028172 | A1 | 1/2019 | Hudson et al. |
| 2019/0028950 | A1 | 1/2019 | Triolo et al. |
| 2019/0037468 | A1* | 1/2019 | Bongaarts ............. H04W 36/32 |
| 2020/0296649 | A1 | 9/2020 | Dudzinski et al. |

FOREIGN PATENT DOCUMENTS

| | | | |
|---|---|---|---|
| EP | 2323216 | A1 | 5/2011 |
| EP | 2490389 | A1 | 8/2012 |
| EP | 3387861 | A1 | 10/2018 |
| WO | 2006105316 | A2 | 10/2006 |
| WO | 2006105316 | A3 | 12/2006 |
| WO | 2014044450 | A1 | 3/2014 |
| WO | 2017097997 | A1 | 6/2017 |
| WO | 2018078004 | A1 | 5/2018 |

OTHER PUBLICATIONS

EP Extended Search Report in 20160484.0 dated Jul. 21, 2020, 7 pages.
Alcatel-Lucent—'Using air-to-ground LTE for in-flight ultra-broadband', 12 pages, 2015.
Application No. GB1903217.6—Search report dated Sep. 6, 2019.
EP 20158047.9—European Extended Search Report dated Aug. 4, 2020, 9 pages.
GB 1903217.6—Search Report dated Sep. 5, 2019, 3 pages.
"Using air-to-ground LTE for in-flight ultra-broadband," Alcatel-Lucent, Strategic White Paper, May 2015, accessible online:<https://www.tmcnet.com/tmc/whitepapers/documents/whitepapers/2015/11529-using-air-to-ground-lte-in-flight-ultra.pdf>, 12 pages.
U.S. Appl. No. 16/814,553—Office Action dated May 11, 2021, 13 pages.
EP 20160448.5—EP Extended Search Report dated Jul. 17, 2020, 7 pages.
GB 1910318.3—GB Search Report dated Sep. 17, 2020, 3 pages.
U.S. Appl. No. 16/814,563—Office Action dated Jul. 23, 2021, 16 pages.
EP Office Action from EP201580479 (1048) dated Feb. 11, 2022, 8 pages.
U.S. Office Action from U.S. Appl. No. 16/814,563 dated Jul. 23, 2021, 16 pages.
GB Examination Report from GB1910318.3 (1050) dated Feb. 16, 2022, 5 pages.
GB Examination Report 1912797.6 (1049) dated Feb. 25, 2022, 5 pages.

* cited by examiner

TRANSMISSION ADJUSTMENT WITHIN A WIRELESS NETWORK FOR A MOVING VEHICLE

BACKGROUND

The present technique relates to the field of wireless communications.

It is known to provide air-to-ground (ATG) communication systems for communication between moving aircraft and a network of ground stations. Such systems can, for example, be used to provide a Wi-Fi hotspot within the aircraft in order to provide connectivity to passengers in the aircraft. With increasing demands for higher capacity, there is a desire to support modern telecommunications Standards such as 4G (LTE) in ATG systems. However, this presents a number of technical issues.

SUMMARY

In one example arrangement, there is provided an apparatus comprising: base station location identifying circuitry to obtain base station location information for a plurality of base stations that provide a wireless network for communication with a moving vehicle, the plurality of base stations comprising a current base station connected with the moving vehicle and one or more other base stations; moving vehicle tracking circuitry to obtain moving vehicle tracking information for the moving vehicle; correction determination circuitry to determine, based on the moving vehicle tracking information and the base station location information, transmission adjustment control information associated with each other base station; and an interface configured to transmit, for reception by the moving vehicle, the transmission adjustment control information associated with at least a selected other base station, to enable the moving vehicle to adjust a signal transmitted to the selected other base station when a handover procedure is performed to transition communication with the moving vehicle from the current base station to the selected other base station.

In another example arrangement, there is provided a method comprising: obtaining base station location information for a plurality of base stations that provide a wireless network for communication with a moving vehicle, the plurality of base stations comprising a current base station connected with the moving vehicle and one or more other base stations; obtaining moving vehicle tracking information for the moving vehicle; determining, based on the moving vehicle tracking information and the base station location information, transmission adjustment control information associated with each other base station; and transmitting, for reception by the moving vehicle, the transmission adjustment control information associated with at least a selected other base station, to enable the moving vehicle to adjust a signal transmitted to the selected other base station when a handover operation procedure is performed to transition communication with the moving vehicle from the current base station to the selected other base station.

In yet another example arrangement, there is provided an apparatus comprising: means for obtaining base station location information for a plurality of base stations that provide a wireless network for communication with a moving vehicle, the plurality of base stations comprising a current base station connected with the moving vehicle and one or more other base stations; means for obtaining moving vehicle tracking information for the moving vehicle; means for determining, based on the moving vehicle tracking information and the base station location information, transmission adjustment control information associated with each other base station; and means for transmitting, for reception by the moving vehicle, the transmission adjustment control information associated with at least a selected other base station, to enable the moving vehicle to adjust a signal transmitted to the selected other base station when a handover operation procedure is performed to transition communication with the moving vehicle from the current base station to the selected other base station.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
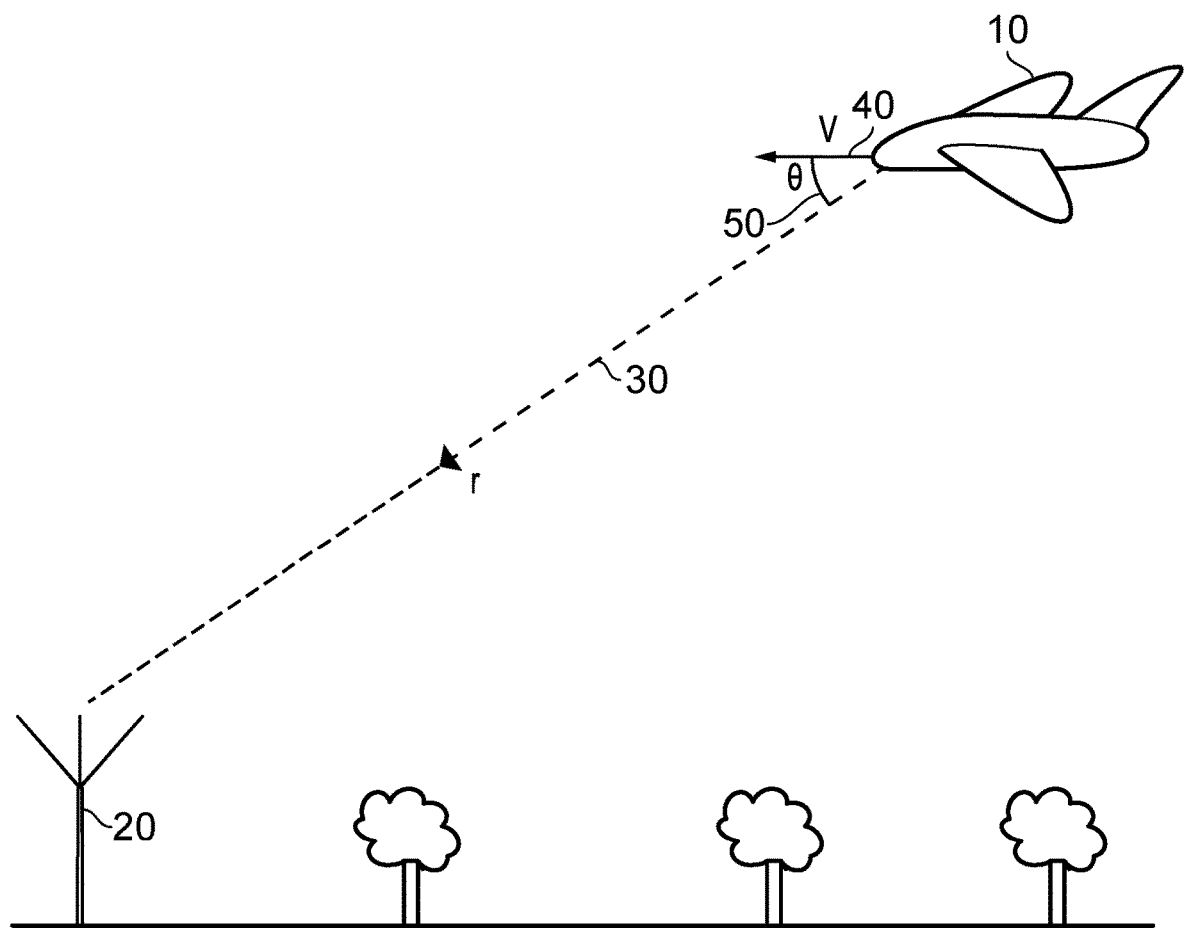
FIG. 1 is a diagram schematically illustrating an air-to-ground (ATG) communication between an aircraft and a ground station.

As mentioned earlier, a number of technical issues can arise when seeking to support modern telecommunications Standards such as 4G (LTE) in systems such as ATG systems. One particular issue that arises is interference between carrier signals due to the impact of the Doppler effect on the frequencies of signals transmitted between the ground terminal and the vehicle terminal (in the aircraft). This is particularly significant in modern telecommunications Standards such as 4G, due to the high frequency of signals that are transmitted according to these Standards—coupled with the high speeds with which modern aeroplanes travel, this means that the Doppler effect can be significant in ATG communication, since the Doppler effect is dependent on both the velocity of the vehicle and the frequency of the signal.

While it may be possible to mitigate some of the problems caused by the Doppler effect by choosing modulation schemes for the signals that are more resilient to interference, such schemes typically result in reduced throughput, which has the unwanted effect of lowering the capacity of communication in the system. The present technique, therefore, aims to overcome some of the issues related to the Doppler effect in ATG communication, without significantly reducing the capacity.

An additional technical issue that can arise is in relation to a timing delay of a transmitted signal, due to the separation distance between the transmitter and the receiver. This issue is of particular concern during a sign-on procedure to seek to establish a communication link between the vehicle terminal (air terminal) and the ground terminal (base station)—for example, when using a modern telecommunications Standard such as 4G (LTE), it is necessary during the sign-on procedure for the vehicle terminal to issue a connection setup signal so that it can be received by the ground terminal within an identified timing window. There are various formats of connection setup signal that can be used, but the maximum separation distance between the moving vehicle and ground terminal that can be supported in 4G (LTE) is of the order of approximately 100 km. If the separation distance exceeds that, then the connection setup signal will not be received within the specified timing window, and a communication link will hence not be established. However, in known ATG systems, the network of ground terminals may be such that the separation distance between the aircraft and the ground terminal with which a communication link is sought to be established may be up to 400 km.

Whilst an aircraft is given as an example of a moving vehicle to which the techniques described herein may be applied, the techniques can be applied to other types of moving vehicles, for example a train, where the ground terminals may typically be spread out along the track.

The techniques described herein recognise that a mechanism is needed by which timing and frequency corrections for signals to be transmitted by the vehicle terminal can be determined. Moreover, the inventors recognised that it would also be beneficial to determine frequency and timing corrections for other base stations not currently in communication with the moving vehicle, for example to ensure that a handover procedure to transition communication with the moving vehicle from the current base station to the selected other base station can be carried out more smoothly.

In one example arrangement, the present technique provides an apparatus including base station location identifying circuitry to obtain base station location information for a plurality of base stations that provide a wireless network for communication with a moving vehicle, the plurality of base stations comprising a current base station connected with the moving vehicle and one or more other base stations. The apparatus also comprises moving vehicle tracking circuitry to obtain moving vehicle tracking information for the moving vehicle and correction determination circuitry to determine, based on the moving vehicle tracking information and the base station location information, transmission adjustment control information associated with each other base station. An interface of the apparatus is then configured to transmit, for reception by the moving vehicle, the transmission adjustment control information associated with at least a selected other base station, to enable the moving vehicle to adjust a signal transmitted to the selected other base station when a handover procedure is performed to transition communication with the moving vehicle from the current base station to the selected other base station.

According to the present technique, as described above, transmission adjustment control information may be determined for a plurality of base stations in a neighbourhood of candidate base stations for connection with the vehicle terminal. These corrections may be transmitted for reception by the moving vehicle, allowing the capabilities of 4G (LTE) communication to be extended to larger ranges and higher speeds of moving vehicle. The determination of the transmission adjustment control information is performed centrally (e.g. in a separate apparatus within the network, rather than at the vehicle terminal). This allows corrections to be determined for base stations which are not yet connected with the moving vehicle, allowing handover to these other base station to be performed more smoothly. Moreover, determining the transmission adjustment control information centrally, rather than in either the base station or the air terminal, allows the present technique to be more easily integrated into existing communications networks, operating according to existing Standards such as 4G (LTE).

In some examples, the transmission adjustment control information comprises at least one of frequency adjustment information and timing adjustment information. The frequency adjustment information is indicative of a frequency adjustment to be applied to a transmission frequency of a signal transmitted by the moving vehicle, so as to reduce a frequency difference between an observed frequency of that signal at the selected base station and a predetermined uplink frequency, and the timing adjustment information indicative of a timing adjustment to be applied to a transmission time of such a signal, so as to reduce a timing difference between a reception timing of that signal at the selected base station and an expected timing.

The predetermined uplink frequency is a frequency at which the selected base station expects to receive an uplink (also referred to as reverse link herein) signal from the moving vehicle, whereas the observed frequency is the actual frequency of that signal. Regarding the timing adjustment information, the reception timing refers to a time or a time slot in which the uplink signal is received at the selected base station, whereas the expected timing refers to a time or time slot (for example, a particular sub-frame or group of sub-frames) within which the base station expects to receive the signal. An uplink signal is a signal transmitted from the moving vehicle to a base station, whereas a downlink (also referred to as forward link herein) signal is a signal transmitted from a base station to the moving vehicle.

According to the above example, a Doppler correction can be applied to the frequency of signals transmitted by the moving vehicle, or a timing adjustment can be applied to the transmission timing of a signal. For example, the timing correction could be applied during a sign-on procedure between the moving vehicle and the selected other base station, in accordance with a handover procedure. The apparatus is capable of transmitting the timing adjustment information, the frequency adjustment information, or both. It should be noted that communication within systems such as 4G (LTE) is carried out using communication frames, and the reception timing of the signal received by the selected base station may be specified with reference to a particular feature of the communication frame, such as the start of the frame. Moreover, as will be discussed in more detail below, the reception timing may refer to a particular sub-frame within the communication frame.

In some examples, the adjustment control information comprises absolute adjustment control information or relative adjustment control information. The absolute adjustment control information comprises at least one of an absolute frequency adjustment and an absolute timing adjustment to be applied to the signal as generated by a terminal device of the moving vehicle, and the relative adjustment control information comprises at least one of a relative frequency adjustment and a relative timing adjustment to be applied to the signal in addition to at least one of an existing frequency adjustment and an existing timing adjustment.

Thus, the techniques described herein can be applied either in addition to or in place of an alternative mechanism for adjusting the frequency or the timing of signals transmitted by the moving vehicle. For example, the techniques can be applied regardless of whether the moving vehicle itself is also capable of performing timing and frequency adjustments. Thus, the system is versatile and can be applied regardless of the existence or otherwise of additional mechanisms.

In some examples, the moving vehicle tracking information comprises information indicative of a location and a velocity of the moving vehicle.

The Doppler effect on the frequency of signals transmitted by the moving vehicle depends on the velocity of the vehicle, and also depends on the separation distance between the vehicle and the base station. Similarly, the timing offset is also dependent on the separation distance. From the position information of the base station (identified by the base station location identifying circuitry) and of the moving vehicle (part of the moving vehicle tracking information), the vector or scalar separation distance between the moving vehicle and the base station can be calculated, enabling an accurate determination of the transmission adjustment control information to be made (with the velocity also being needed in the case where the transmission adjustment control information is frequency adjustment information).

There are a number of ways in which the moving vehicle tracking circuitry may determine the location and velocity of the moving vehicle. In some examples, the interface is configured to receive, from the current base station, identification information of the moving vehicle, and the moving vehicle tracking circuitry is configured to obtain the location and the velocity of the moving vehicle by accessing a tracking information database using the identification information of the moving vehicle.

Thus, the present technique can make use of existing, publicly-accessible, tracking information databases (such as aviation databases, in the case where the moving vehicle is an aircraft). This ensures that the moving vehicle tracking circuitry is able to determine up-to-date tracking information for the vehicle, without requiring such information to be transmitted by the vehicle. However, in an alternative implementation such information could be transmitted by the vehicle itself.

As mentioned above, both the timing delay and the Doppler effect depend on the separation distance between the moving aircraft and the base station. Thus, in order to calculate the correction information in either case, some examples of the apparatus comprise distance computation circuitry configured to determine, for each other base station, separation information indicating a separation between the moving vehicle and that other base station based on the location of the moving vehicle and a location of that other base station.

Thus, based on the locations of the base station and the vehicle, the apparatus can calculate the separation distance, in order to accurately determine the transmission adjustment control information.

In particular, the Doppler effect relies on the vector separation between the vehicle and the base station. Thus, in some examples, where the transmission adjustment control information comprises said frequency adjustment information, the separation information identifies a vector separation. The correction determination circuitry is then configured to determine the frequency adjustment information associated with each other base station based on the velocity of the moving vehicle and the vector separation between the moving vehicle and that other base station.

Such an approach can enable an accurate determination of the frequency correction information.

On the other hand, when the transmission adjustment control information comprises said timing adjustment information, the correction determination circuitry may be configured to determine the timing adjustment information associated with each other base station based on the separation (which can be presented as a scalar value) between the moving vehicle and that other base station.

This ensures the accuracy of the determination of the timing correction information.

The one or more other base stations for which the transmission adjustment control information is calculated may form part of a neighbourhood of base stations in range of the moving vehicle—the other base stations are thus candidate base stations for a handover procedure. The other base stations may be identified in a number of ways; in some examples, the base station location identifying circuitry is configured to identify the one or more other base stations with reference to a bearing of the moving vehicle.

The bearing refers to the direction a vehicle is facing, which may be different to the direction in which it is travelling. For example, if the vehicle is an aircraft, the bearing of the vehicle refers to the direction in which the nose of the aircraft is pointing, and may differ from the direction of travel due to factors such as wind. The above example enables the potential pool of potential handover candidates (for example as determined from the network neighbourhood information for the currently connected base station) to be narrowed down in accordance with factors which may affect the signal quality, should a particular base station be selected as a candidate for a handover procedure. It is particularly useful to consider the bearing of the vehicle when selecting the other base stations, since the signal strength between a given base station and the vehicle may depend on the directionality of transmitted signals. For example, the vehicle may have an antenna in a particular location (e.g. on one side), which enables a stronger signal strength for base stations closer to that part of the vehicle. Thus, the bearing (or heading) of the vehicle will affect the signal strength. By selecting the other base stations in dependence on the bearing, the number of base stations for which the calculation is made can be narrowed down, avoiding wasting time or power on calculating correction information for base stations which are unlikely to be selected as candidates for the handover procedure. For example, avoiding wasting time can allow for a handover between base stations to take place more quickly, reducing any interruption to traffic flows that could occur when a handover is not carried out in a timely manner.

Furthermore, the effect of bearing on the signal strength is particularly pronounced in ATG communication, since aeroplanes are often large, and hence for example the fuselage of the aircraft may partially obscure the aircraft's antenna(s) from one or more base stations. Furthermore, as mentioned above, the difference between the bearing and the direction of travel may be more noticeable for aircraft than for other vehicles, since they are more strongly affected by the wind than ground-based vehicles. Thus, using the bearing in the identification of the one or more other base stations is particularly beneficial in ATG communication networks. It is noted, however, that this feature may apply to any moving vehicle, even in the case where the bearing and the direction of travel are the same.

While it is particularly beneficial to calculate transmission adjustment control information for a plurality of base stations not currently in communication with the moving vehicle—as discussed in the above examples—it is also beneficial to perform the same determination for the current base station. Thus, in some examples, the correction determination circuitry is configured to perform a process of determining further transmission adjustment control information associated with the current base station, and the interface is configured to transmit, for reception by the moving vehicle, the further transmission adjustment control information, to enable the moving vehicle to adjust at least one further signal transmitted to the current base station.

In this way, ongoing adjustments can be made to the frequency and timing of signals transmitted by the moving vehicle to the current base station.

In some examples, the correction determination circuitry is configured to iteratively perform the above process of determining further transmission adjustment control information, to enable ongoing adjustment of signals to be transmitted by the moving vehicle to the current base station.

In this way, continuous corrections to signals transmitted from the moving vehicle to the current base station can be made, based on the transmission adjustment control information. This can allow high signal quality with few interruptions to be maintained throughout the period in which the vehicle is in communication with the current base station.

When determining the further transmission adjustment control information for the current base station, a number of different techniques can be employed. In some examples, the interface is configured to receive offset information for a plurality of previous signals received at the current base station from the moving vehicle, the offset information comprising at least one of frequency offset information indicative of a difference between an observed frequency of each of the plurality of previous signals received at the current base station and a predetermined uplink frequency of that previous signal, and timing offset information indicative of a difference between a reception timing of each of the plurality of previous signals at the current base station and an expected timing for that previous signal. The correction determination circuitry is then configured to determine the further transmission adjustment control information based on the offset information.

In this way, the correction determination circuitry does not need to know the vehicle tracking information or the location of the current base station in order to make an accurate determination of the further transmission adjustment control information. Instead, the determination is made based on previous signals transmitted by the moving vehicle to the base station.

This can be done in a number of ways. In some examples, the correction determination circuitry may be configured to determine the further transmission adjustment control information by calculating a filtered estimate of the ongoing adjustments to be made to transmitted signals, from the offset information received for said plurality of previous signals. For example, a Kalman filter can be used to estimate the ongoing adjustments, using a series of measurements observed over time. Alternatively, another type of filtering mechanism could be used.

However, the above mechanism for determining the further transmission adjustment control information is not the only mechanism that can be employed. In some examples, where the further transmission adjustment control information associated with the current base station comprises frequency adjustment information associated with the current base station, the distance computation circuitry is configured to determine, for the current base station, a vector separation between the moving vehicle and the current base station based on the location of the moving vehicle and a location of the current base station. The correction determination circuitry is then configured to determine the frequency adjustment information associated with the current base station based on the vector separation between the moving vehicle and the current base station and the velocity of the moving vehicle.

In some examples, where the further transmission adjustment control information associated with the current base station comprises timing adjustment information associated with the current base station, the distance computation circuitry may be configured to determine, for the current base station, further separation information indicating a separation between the moving vehicle and the current base station based on the location of the moving vehicle and a location of the current base station. The correction determination circuitry is then configured to determine the timing adjustment information associated with the current base station based on the separation between the moving vehicle and the current base station.

In this way, the frequency adjustment information and the timing adjustment information associated with the current base station can each be calculated even if no offset information has been received. This improves the versatility of the system.

As mentioned above, the interface is configured to transmit the transmission adjustment control information so that it can be received by the moving vehicle. This can be achieved in a variety of ways. In some examples, the interface is configured to transmit the transmission adjustment control information to the current base station, for reception by the moving vehicle. The current base station can then propagate the information on to the moving vehicle via the wireless communication link established between it and the moving vehicle.

In existing 4G (LTE) systems, communication with an item of user equipment is typically effected via the current base station. Thus, the above feature allows the system to be integrated with existing 4G systems, improving the compatibility of this new system with existing systems.

In some examples, the transmission adjustment control information is transmitted in an IP (Internet Protocol) packet comprising identification information of one of the plurality of base stations, a relative bit indicative of whether the transmission adjustment control information comprises relative adjustment control information or absolute adjustment control information, the transmission adjustment control information, and identification information of the moving vehicle.

In this way, all of the relevant information is transmitted to the current base station in a form that is compatible with the 4G Standard, further improving the compatibility of the system with existing systems.

As discussed above, the present technique may be particularly useful when preparing to carry out a handover procedure, to transfer a moving vehicle from the current base station to a selected other base station. Thus, in some examples, the interface is also configured to transmit the transmission adjustment control information associated with the selected other base station for reception by said selected other base station.

This might involve the apparatus transmitting the transmission adjustment control information associated with the selected other base station directly to that base station, or it might send the information to the current base station to be forwarded to the selected base station. In this way, the selected other base station can be provided with information about the adjustments to the frequency and timing of signals that will be transmitted to it by the moving vehicle, which can enable a smoother handover.

In particular, in some examples, the transmission adjustment control information associated with the selected other base station comprises timing adjustment information associated with the selected other base station, and this timing adjustment information can be used by the selected other base station to determine a reception timing of said signal transmitted to the selected other base station when said handover procedure is performed to transition communication with the moving vehicle from the current base station to the selected other base station.

In this way, the selected other base station may be advised upfront of which sub-frame or sub-frames in which to expect reception of a sign-on signal during the handover procedure, reducing the monitoring burden on the selected other base station, and hence improving the efficiency of the handover procedure.

As mentioned throughout the above examples, the above techniques can be applied to any of a number of different types of moving vehicle. However, in some examples, the moving vehicle is an aircraft.

As noted above, the high speed of aircraft and the large separation distance between base stations in ATG networks mean that the above techniques are particularly useful for communication with aircraft.

Particular examples will now be described with reference to the Figures.

The moving vehicles for which the techniques described herein can be utilised can take a variety of forms. For instance, the techniques could be applied in respect of trains, where the ground terminals may be spread out along the track. However, for the purposes of the examples discussed herein, it will be assumed that the moving vehicle is an aircraft, such as the airplane 10 shown in FIG. 1. As shown in FIG. 1, the airplane 10 is able to communicate with a ground terminal 20 (which may also be referred to herein as a ground station). A network of ground terminals will be provided, enabling the aircraft 10 to connect to different ground terminals during a flight in order to seek to maintain a communication link that can be used to provide connectivity to passengers in the aircraft. As shown in FIG. 1, the aircraft 10 is assumed to be travelling at a velocity 40, and has a relative separation 30 between it and the ground terminal that it is connected to. This relative separation can be specified as a vector, as can the velocity 40, and there will be an angular separation between the velocity vector and the relative separation vector, namely the angle 50 shown in FIG. 1.

Figure 2:
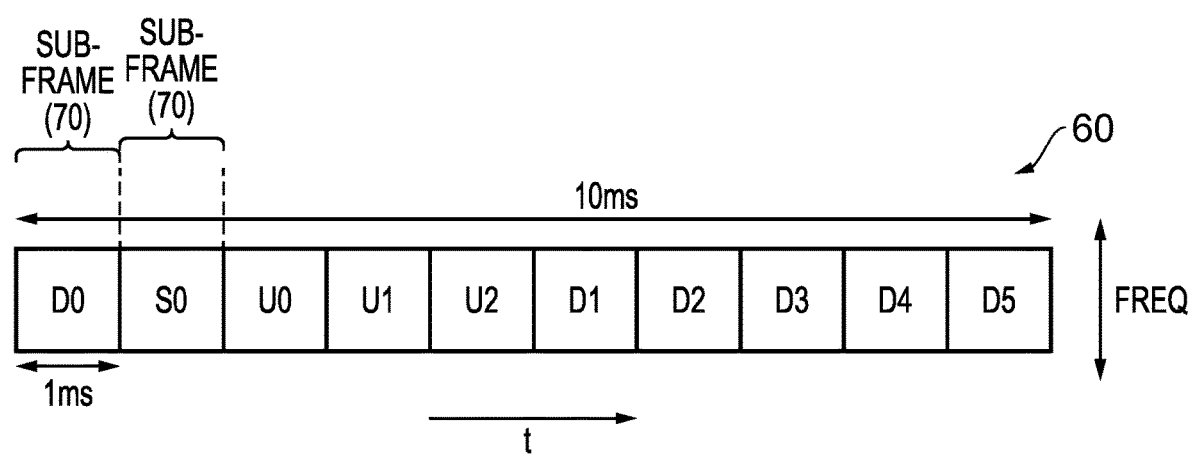
FIG. 2 schematically illustrates the format of a communication frame used in one example implementation.

Communication between the aircraft 10 and a ground station 20 with which a communication link is established can take place within communication frames. An example communication frame that may be used is illustrated in FIG. 2. Here, the communication frame 60 is defined in both the frequency and time domains. In particular, in the time domain, the frame can be considered as consisting of a plurality of sub-frames 70. In one particular example, a communication frame 60 is 10 milliseconds (ms) long, and there are ten sub-frames in the communication frame, where each sub-frame has a duration of 1 ms. Each sub-frame 70 comprises a number of resource blocks (the resource blocks not being shown separately in FIG. 2), a resource block being the smallest allocable portion of the communication frame.

A sub-frame may be allocated for downlink communication (also referred to herein as forward link communication) from a ground terminal 20 to the aircraft 10, or can be allocated for uplink communication (also referred to herein as reverse link communication) from the aircraft 10 to the ground terminal 20. In FIG. 2, sub-frames allocated for downlink communication are prefixed with the letter "D" and sub-frames allocated for uplink communication are prefixed with the letter "U". As also shown in FIG. 2, one or more sub-frames may be allocated as special sub-frames (prefixed by the letter "S"). These can be used as a gap sub-frame to provide some separation between downlink communication and uplink communication. However, it is possible that not the entirety of the special sub-frame is left as a gap. In particular, each sub-frame can be considered as consisting of a plurality of symbols, in one particular example there being 14 symbols within each sub-frame. Hence, one or more of the symbols may be allocated for downlink communication and one or more of the symbols may be allocated for uplink communication, with the remaining symbols being left free. In one specific implementation of the communication frame format shown in FIG. 2, the first three symbols within the special sub-frame S0 can be used for downlink communication, and the final symbol may be used for uplink communication. This leaves 10 symbols free, which in one embodiment equates to a 0.712 ms gap.

Figure 3:
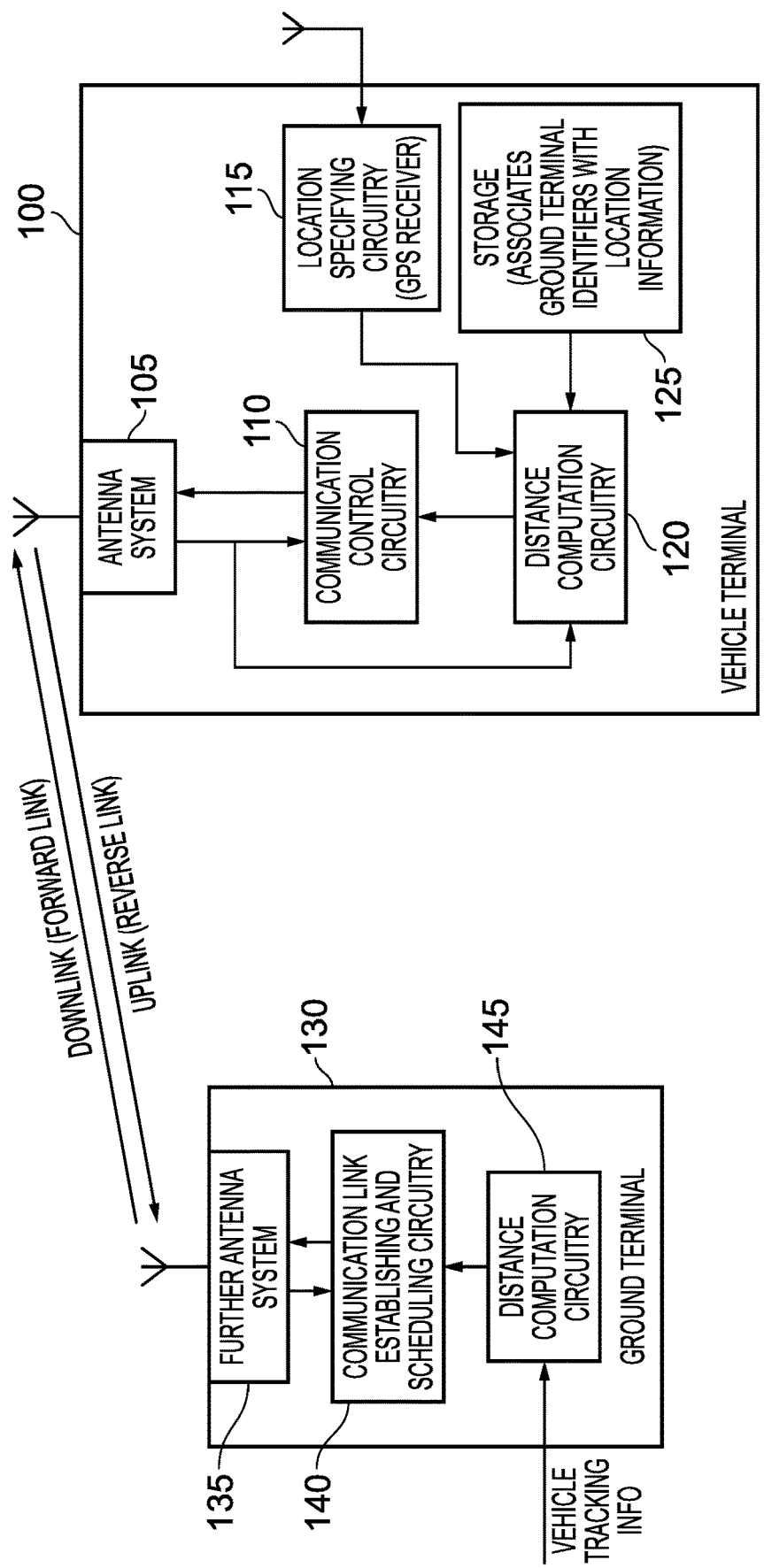
FIG. 3 is a block diagram illustrating components provided within a vehicle terminal and a ground terminal in accordance with one example arrangement.

FIG. 3 is a block diagram illustrating more details of the components provided within a vehicle terminal 100 and a ground terminal 130. The vehicle terminal 100 may for example be provided within the aircraft 10 shown in FIG. 1, whereas the ground terminal 130 may form the ground station 20 shown in FIG. 1.

The vehicle terminal 100 has an antenna system 105 used to communicate wirelessly with the ground terminal 130. The antenna system 105 may include all of the electronics used to convert between baseband and RF signals for both data to be transmitted from the vehicle terminal's antenna and for data received by the vehicle terminal's antenna. Communication control circuitry 110 is provided for controlling the operation of the antenna system 105. To assist the communication control circuitry 110 in performing the control operations to be described in more detail herein, the communication control circuitry 110 has access to distance computation circuitry 120 that can be used to determine the separation between the vehicle terminal 100 and the ground terminal 130. In some example implementations, that separation is expressed as a vector identifying the relative separation between the two antenna systems, whilst in other implementations that separation may be expressed as an absolute separation distance (i.e. a scalar term rather than a vector term).

The distance computation circuitry 120 may have access to location specifying circuitry 115 that can provide information identifying the current location of the vehicle terminal 100. The location specifying circuitry can take a variety of forms, but in one example implementation is a GPS receiver.

The distance computation circuitry 120 can be arranged to operate in a variety of ways, but in one example implementation extracts information from a downlink communication in order to seek to identify the location of the ground terminal 130. That information could in principle directly identify the coordinates of the ground terminal, but in one example implementation that information is an identifier of the ground terminal, and the distance computation circuitry uses that identifier in order to obtain the coordinates of the ground terminal.

In particular, as shown in FIG. 3, in one example implementation the vehicle terminal 100 has a storage device 125 providing a correlation between ground terminal identifiers and associated location information. Accordingly, a lookup operation can be performed within the storage using the identifier information extracted from the downlink signal, in order to obtain the location information of the ground terminal. Using that information, and the location information from the GPS receiver 115, the distance computation circuitry 120 can then calculate the separation between the vehicle terminal and the ground terminal.

As shown in FIG. 3, the ground terminal will include a further antenna system 135, which is controlled by communication link establishing and scheduling circuitry 140. The functionality performed by the communication link establishing and scheduling circuitry 140 will be discussed in more detail later. However, in one implementation that component has access to distance computation circuitry 145 that can compute the separation between the ground terminal 130 and the vehicle terminal 100. As with the earlier-discussed distance computation circuitry 120, the distance computation circuitry may produce that separation as a vector quantity, or as a scalar quantity dependent on implementation. In one example implementation, the distance computation circuitry will know the coordinate information of the ground terminal 130, which it will be appreciated is fixed, and will obtain vehicle tracking information indicative of the current location of the vehicle terminal 100. This vehicle tracking information can be obtained in a variety of ways. However, considering the example of an aircraft 10 shown in FIG. 1, it will be appreciated that there are available resources that track in real time the coordinates of aircrafts, and that information can be obtained in order to provide the distance computation circuitry 145 with the required vehicle tracking information for the vehicle terminal 100.

The separation between the ground terminal 130 and the vehicle terminal 100 determined by the distance computation circuitry 120 is calculated as a vector value, indicating both a magnitude (distance) and direction (angle). In one example implementation, analysis circuitry performs a Doppler adjustment process to determine an adjustment to be made to the transmission frequency of the uplink (reverse link) signal, based on the vector separation determined by the distance computation circuitry. The analysis circuitry therefore encompasses the distance computation circuitry 120 and at least some of the functionality of the communication control circuitry 110. The transmitted frequency ($f_t$) of the transmitted signal (uplink signal) is determined such that the observed frequency of the uplink signal when it is received by the further antenna system 135 equals a predetermined uplink frequency ($f_{UL}$); this is the frequency at which the ground terminal 130 expects to receive the uplink signal, corrected (by the Doppler adjustment process) to account for the Doppler effect in both the received and transmitted signals. The Doppler adjustment process is described in more detail with reference to the examples given below.

Figure 4:
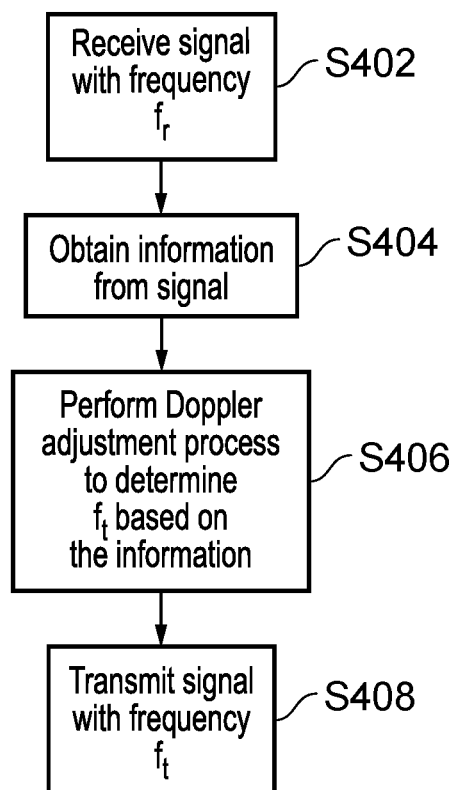
FIG. 4 is a flow diagram illustrating a process performed by the vehicle terminal to determine the transmission frequency ($f_t$) of a transmitted signal.

FIG. 4 is a flow diagram illustrating a method of operation of the vehicle terminal 100. In a first step S402, a received signal (the downlink/forward link signal) is received at the antenna of the antenna system 105, the received signal having a received frequency ($f_r$). At least one item of information—for example, information with which the distance computation circuitry 120 can determine the vector separation between the antenna system 105 of the vehicle terminal 100 and the further antenna system 135 of the ground terminal 130—is obtained at step S404 from the received signal by the distance computation circuitry 120. The information is then used in a Doppler adjustment process S406, to determine the transmitted frequency ($f_t$) with which the uplink signal is to be transmitted, taking into account any frequency shifts due to the Doppler effect.

Once the Doppler adjustment process S406 has been performed, then at step S408 the antenna system 105 can transmit, at the transmitted frequency ($f_t$), the uplink signal to the further antenna system 135.

Figure 5:
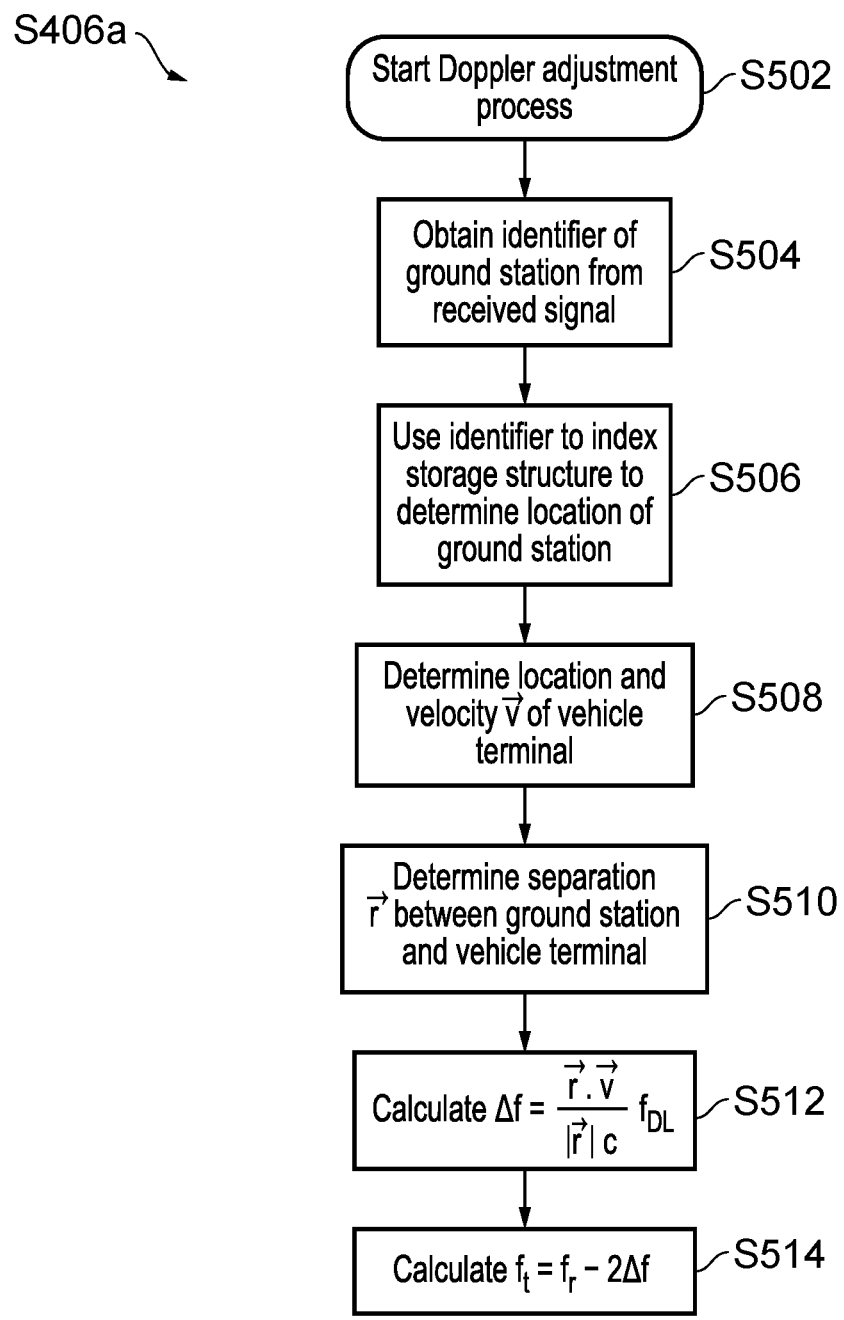
FIG. 5 is a flow diagram showing an example of a Doppler adjustment process performed by the vehicle terminal to determine the transmission frequency ($f_t$) of the transmitted signal.

FIG. 5 is a flow diagram showing an example of the Doppler adjustment process S406a referred to in FIG. 4. This particular example refers to the case where the information extracted from the received signal is an identifier of the ground terminal 130.

The Doppler adjustment process of this example starts at a step S502. At step S504 the distance computation circuitry 120 obtains, from the received downlink signal, an identifier of the ground terminal 135. Using this identifier, the computation circuitry 120 can then index the storage structure 125 in order to determine at step S506 the location of the ground station. The location of the vehicle terminal, along with its velocity, are also determined at step S508. At least the location can be determined by the location specifying circuitry 115, but in instances where the location specifying circuitry 115 is a GPS receiver it will be appreciated that the velocity information can also be determined from the output of the GPS receiver. Using the locations of the ground terminal 130 and the vehicle terminal 100, the vector displacement (separation) between the two terminals can be determined at step S510 by the distance computation circuitry 120, and thus an adjustment value ($\Delta f$) representative of the change in frequency of the received signal due to the Doppler effect can be calculated at step S512. This calculation is performed by the analysis circuitry according to the Doppler formula:

$$\Delta f = \frac{r \cdot v}{|r| c} f_{DL}$$

where r is the vector separation between the ground terminal 130 and the vehicle terminal 100, v is the velocity of the vehicle terminal 100, c is the speed of light and $f_{DL}$ is the predetermined downlink frequency (the frequency at which the ground terminal 130 transmits the downlink signal).

This adjustment value ($\Delta f$) is then used to calculate the transmitted frequency ($f_t$) with which the uplink signal is to be transmitted, in accordance with the following formula:

$f_t = f_r - 2\Delta f$ where $f_r$ is the received frequency of the downlink signal. The above calculations assume that a time division duplex (TDD) scheme is employed, in which the predetermined uplink frequency and the predetermined downlink frequency (the frequencies of the uplink and downlink signals at the ground terminal) are the same. The received frequency of the downlink signal is $f_r = f_{DL} + \Delta f$, and that received frequency is used as the default frequency for transmission from the vehicle terminal 100. Hence the frequency of the transmitted signal needs to be adjusted by $-2\Delta f$ in order to compensate for the Doppler effect in both the received and transmitted signals, such that the frequency of the uplink signal as observed by the ground terminal is $f_{UL} = f_{DL}$.

However, the above approach can also be generalised to a frequency division duplex (FDD) scheme where the predetermined uplink and downlink frequencies differ, as discussed below with reference to FIG. 9, and the adjustment required to the default transmission frequency in that case is the same.

While the example described with reference to FIG. 5 assumes that an identifier of the ground station 130 is obtained from the downlink signal, it is also possible for the downlink signal itself to specify the location (e.g. the coordinates) of the ground terminal 130. In this case, steps S504 and S506 in FIG. 5 would be replaced with a single step of obtaining, from the received signal, the location of the ground terminal 130.

Furthermore, in some examples it may also be possible to calculate the Doppler adjustment $\Delta f$ without knowing the magnitude of the distance (r) between the two terminals, provided that at least the angle θ between the vehicle's velocity and a line connecting the two terminals is known. This is because the dot product between r and v can be calculated as $|r|*|v|*\cos\theta$, so that $|r|$ cancels out in the Doppler formula. The angle θ could be calculated in any of a number of ways; for example, the angle of arrival (AoA) of the incoming downlink signal could be determined using a phase array, to determine the angle relative to the vehicle's heading.

Figure 6:
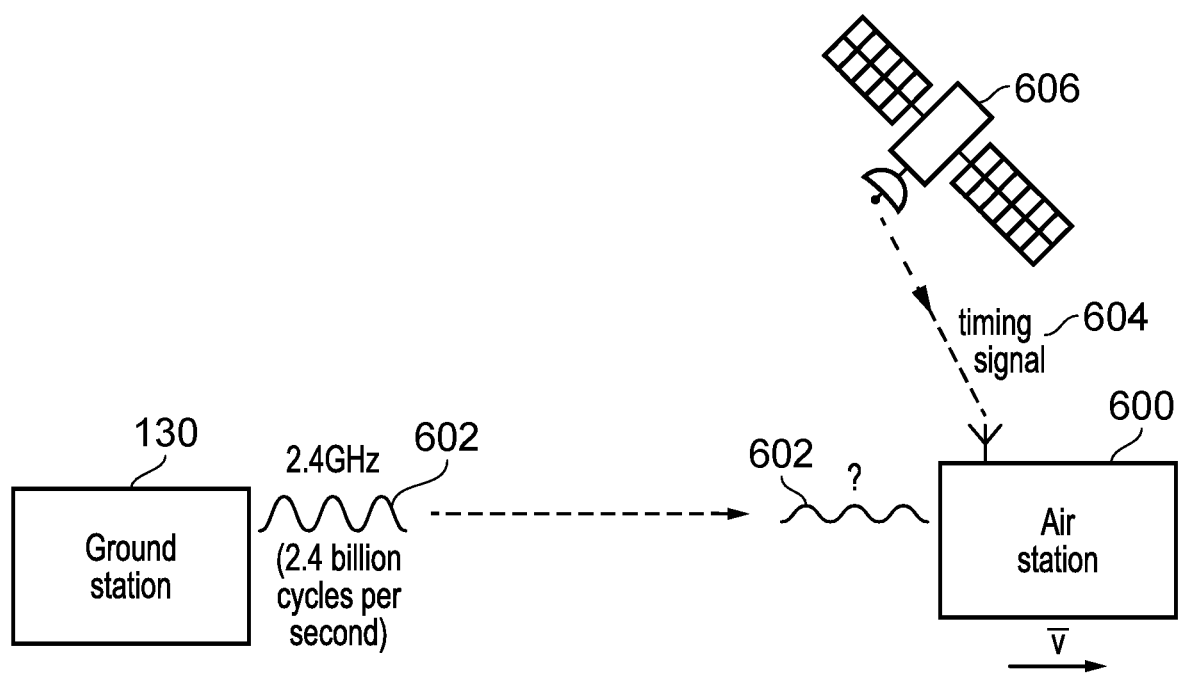
FIG. 6 schematically shows an example of how the Doppler effect affects signals from the ground station, and how the received signal can be used to determine the transmission frequency ($f_t$) of the transmitted signal.

The examples described so far involve calculating, with distance computation circuitry 120, the vector separation between the ground terminal 130 and the vehicle terminal 100. However, other examples instead perform the Doppler adjustment process using information about the received signal itself, rather than information about the ground terminal 130 (such as its location). One such example is demonstrated schematically in FIG. 6. A ground station 130 and an air station 600 (an example of the vehicle terminal 100 shown in FIG. 3) are shown in FIG. 6. The ground station 130 transmits a downlink signal 602 at a frequency (the predetermined downlink frequency $f_{DL}$) of 2.4 GHz (2.4 billion cycles per second). This signal is received a short time later at the air station 600, which is moving away from the ground station 130 with a given velocity (v). Due to the Doppler effect, the frequency of the signal as observed by the air station 600 is lower than 2.4 GHz (or higher if the air station 600 is moving towards the ground station 100), meaning that the number of cycles per second has reduced. In this example, the frequency ($f_r$) of the downlink signal 602 as observed by the air station 600 can be compared with the expected value of the frequency (2.4 GHz) to determine an adjustment ($\Delta f$) to be applied to the transmitted signal (not shown).

The air station 600 also receives a timing signal 604 from a GPS satellite 606, which provides accurate timing information. This timing information can then be used by the air station 600 (more particularly, by the analysis circuitry in the air station 600) to accurately count the number of cycles per second in the received signal 602, to determine how the frequency has changed. This information can then be used by the analysis circuitry to determine the transmitted frequency ($f_t$) of the transmitted signal. Thus, FIG. 6 is an example of the use of information relating to the received signal itself in performing a Doppler adjustment process.

While the arrangement shown in FIG. 6 calculates the received frequency ($f_r$) of the downlink signal as the information relating to the received signal, there are other examples of information about the received signal that could be used instead, for example the number of communication frames 60 received at the air station 600 per second (which can be compared to the expected value of 100 per second), the number of OFDM (Orthogonal Frequency Division Multiplexing) symbols received per second, or the number of primary synchronisation signals (PSSs) counted per second. In fact, any property of the received signal that is affected by the Doppler effect (so any property related to the frequency of the signal) can be used.

Figure 7:
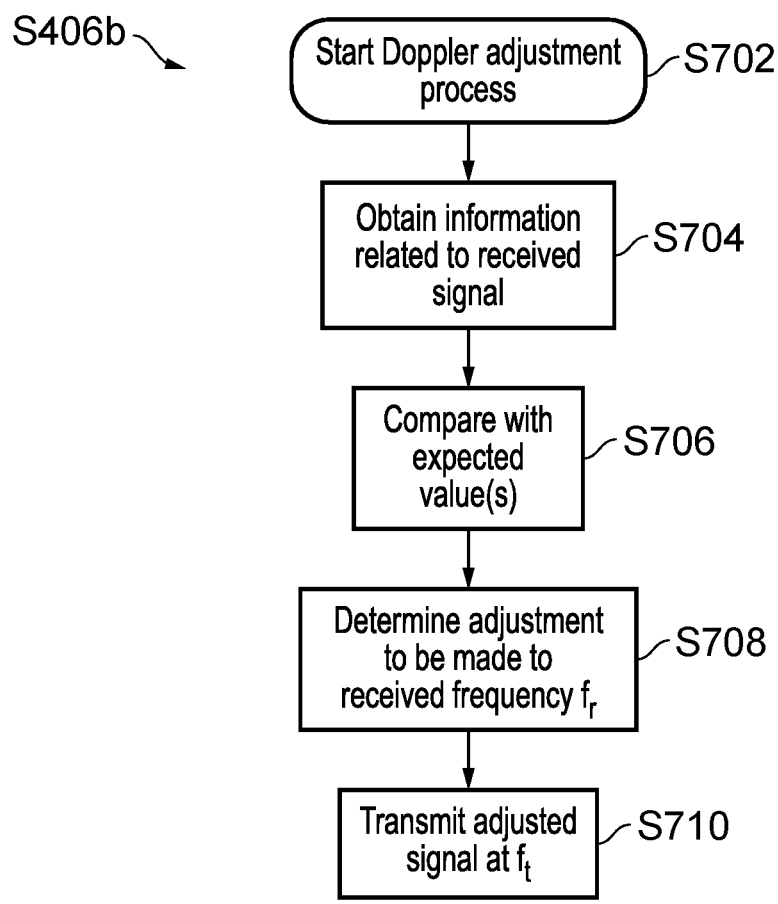
FIG. 7 is a flow diagram showing another example of a Doppler adjustment process performed by the vehicle terminal to determine the transmission frequency ($f_t$) of the transmitted signal.

FIG. 7 is a flow diagram illustrating another example of the Doppler adjustment process S406b applied in FIG. 4, this time using information relating to the received signal, rather than information about the ground terminal 130. In the following example, it is assumed that a TDD scheme is employed, and that the predetermined uplink frequency and predetermined downlink frequency are, therefore, the same.

In FIG. 7, the process begins at a first step S702, before passing to a step S704 of obtaining, from the received signal, information relating to the received signal itself. As mentioned above, this could include the received frequency ($f_r$) of the received signal, or any other property of the received signal impacted by the Doppler effect.

The obtained information is compared at step S706 with one or more expected values, allowing an indication of the Doppler effect on the received signal to be determined, and thus an adjusted transmission frequency ($f_t$) to be determined at step S708. Then, the antenna system 105 transmits the adjusted transmitted signal with transmission frequency ($f_t$).

Figure 8:
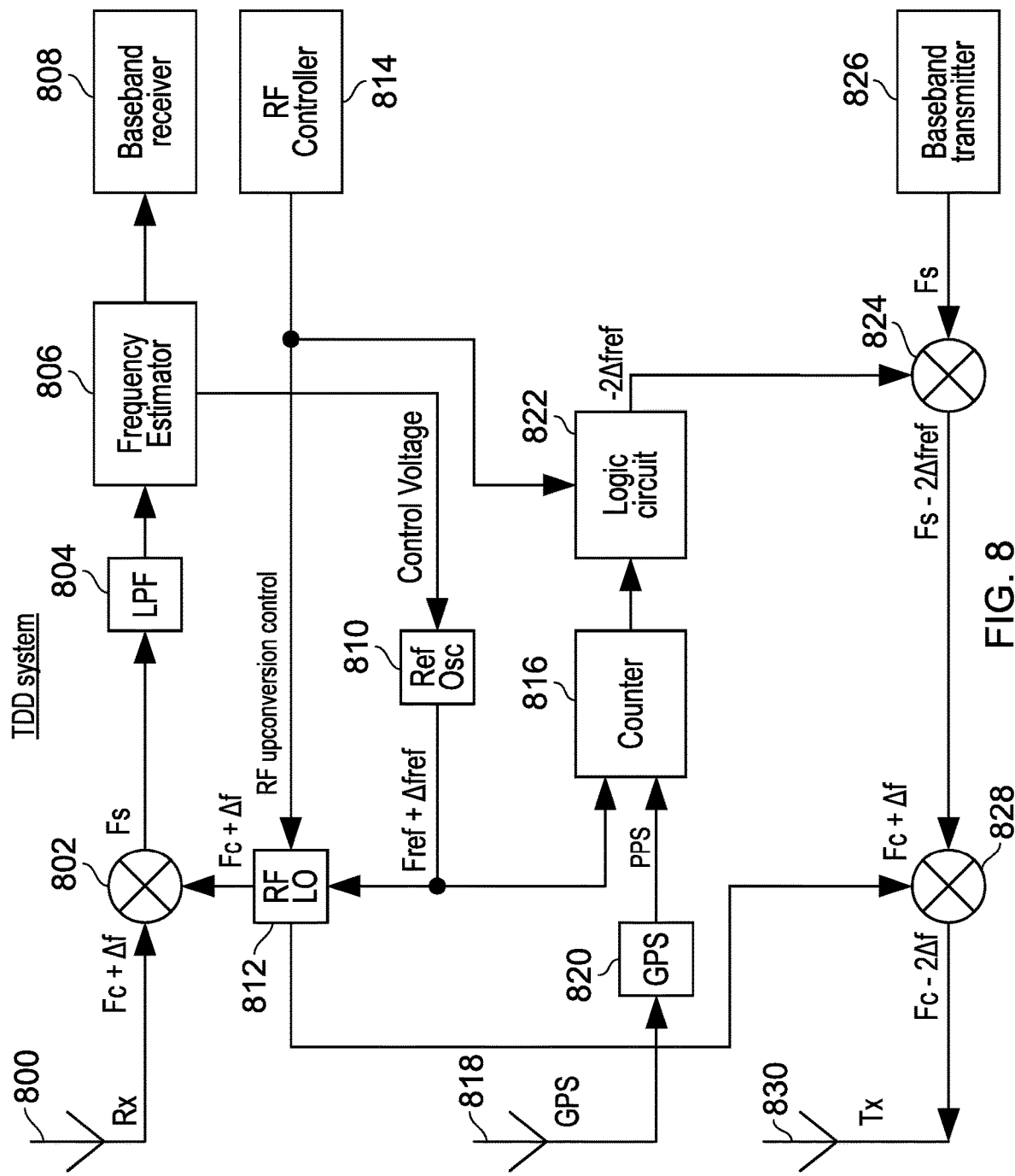
FIGS. 8 and 9 schematically show examples of components in the vehicle terminal, used in the process of determining the transmission frequency ($f_t$) of the transmitted signal.
Figure 9:
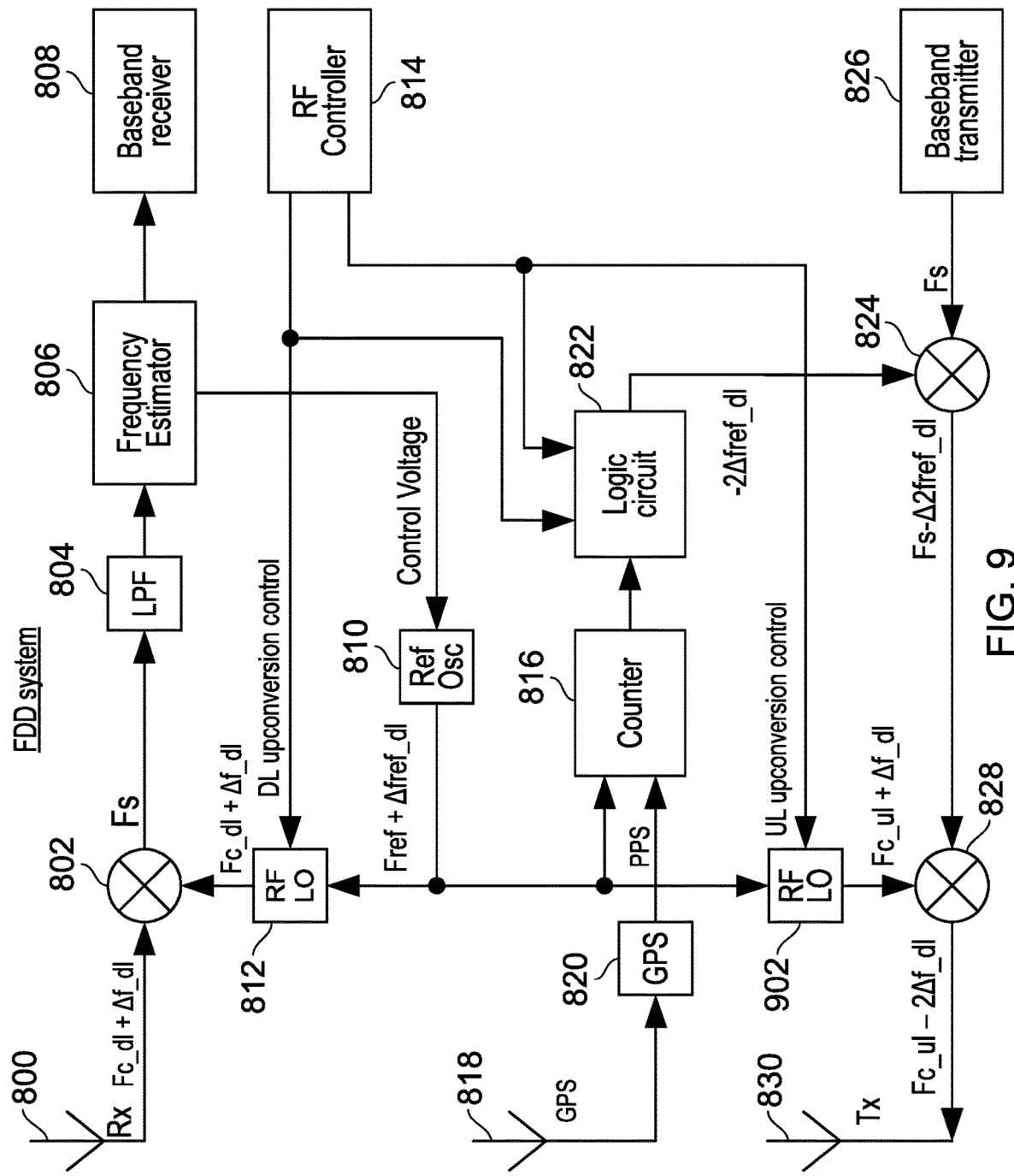

FIGS. 8 and 9 show in more detail some of the elements that may be present in the antenna system 105 and communication control circuitry 110 of the vehicle terminal 100, in accordance with the example described with reference to FIG. 7; in particular, FIGS. 8 and 9 describe components to be used in a system in which an indication of the received frequency ($f_r$) of the received signal is used to perform the Doppler adjustment process. FIG. 8 shows elements present in a vehicle terminal 100 to be used in a time division duplex (TDD) scheme, in which the predetermined uplink frequency and predetermined downlink frequency are the same while FIG. 9 shows an alternative arrangement to be used in a frequency division duplex (FDD) scheme, in which the predetermined uplink frequency and predetermined downlink frequency may be different. As noted above, the predetermined downlink frequency is the frequency with which the ground terminal transmits the downlink signal, and the predetermined uplink frequency is the frequency at which the ground terminal expects to receive the uplink signal.

In FIG. 8, the received signal Rx is received at an antenna 800, the received signal having a frequency equal to the carrier frequency ($f_c$) (the downlink frequency) adjusted according to the Doppler effect ($f_c+\Delta f$). The received signal is fed into a frequency mixer 802, the output of which is fed into a low pass filter (LPF) 804. The frequency estimator 806 estimates the frequency of the received signal based on the output of the LPF 804, and supplies the signal to a baseband receiver 808. The frequency estimator 806 also supplies a control voltage to a reference oscillator 810, to cause the reference oscillator 810 to then output a reference signal at a frequency ($F_{ref}+\Delta F_{ref}$). The reference signal is fed into a local oscillator 812, which multiplies the reference frequency by an upscaling factor $\alpha$ and outputs the resulting signal—corresponding to an estimation of the frequency of the received signal—back into the frequency mixer 802. The upscaling factor $\alpha$ is determined based on an RF upconversion control signal received at the local oscillator 812 from an RF controller 814. Thus, the above process implements a feedback loop, and the frequency estimated by the frequency estimator 806 is more accurate with every pass.

The signal output by the reference oscillator 810 is also fed into a counter 816. A timing signal, received at a GPS antenna 818 and processed by a GPS element 820 is also fed into the counter 816. The timing signal provides one pulse per second (PPS), and hence, using the timing signal, the counter 816 can count the number of cycles per second in the reference signal output by the reference oscillator 810.

The counter 816 feeds into a logic circuit 822, controlled by the RF controller 814, which determines a downscaled adjustment value ($2\Delta f_{ref}$). The downscaled adjustment value ($2\Delta f_{ref}$) and the output of a baseband transmitter 826 (having a frequency of $F_s$) are then fed into a second frequency mixer 824.

The second frequency mixer 824 then outputs a signal ($F_s-2\Delta f_{ref}$) to a third frequency mixer 828. The third frequency mixer 828 also receives an input from the local oscillator 812 (i.e. a signal representing the received frequency), and outputs a signal with frequency $F_c-2\Delta f$, which is the adjusted transmitted frequency described in earlier figures. This signal can then be transmitted as the uplink signal by an antenna 830.

The arrangement shown in FIG. 9 is almost identical to that shown in FIG. 8, with one main difference: the arrangement in FIG. 9 also includes a second local oscillator 902, which receives signals from the reference oscillator 810 and the RF controller 814. This allows for the signal fed into the third frequency mixer 828 ($F_{c\_ul}+\Delta f_{\_dl}$) to take into account the difference in frequency between the uplink and downlink signals in an FDD system.

It should be noted that the frequency of the transmitted signal is adjusted by a value of $2\Delta f$, regardless of whether or not the downlink frequency $f_{DL}$ and the uplink frequency $f_{UL}$ are the same. This can be shown as follows:

The Doppler frequency on the Forward Link (FL) is given by:

$$\Delta f^{FL} = \frac{r \cdot v}{|r|c} f_c^{FL}$$

where $f_c^{FL}$ denotes the centre frequency on the forward link (downlink), c is the speed of light, v is the velocity vector and r is the relative distance to the base station. The ($\cdot$) symbol denotes the dot product operator, wherein $r \cdot v = (r_x, r_y, r_z) \cdot (v_x, v_y, v_z) = r_x v_x + r_y v_y + r_z v_z$.

The Doppler frequency on the Reverse Link (RL), assuming that the carrier frequency is $f_c^{RL}$, is given by:

$$\Delta f^{RL} = \frac{r \cdot v}{|r|c} f_c^{RL}$$

The reference oscillator will therefore converge to:

$$f^{REF} = (f_c^{FL} + \Delta f^{FL})/\alpha^{FL} = \left(1 + \frac{r \cdot v}{|r|c}\right) f_c^{FL}/\alpha^{FL}$$

where $\alpha^{FL}$ denotes the upscaling (multiplicative) factor for the forward link. For example, if $f^{REF}$=40 MHz, the $a^{FL}$=60 to ensure the centre frequency will be at 2.4 GHz.

The received frequency at the base station (ground terminal) will be multiple of the reference frequency ($f^{REF}a^{RL}$), adjusted by the Doppler effect. That is $$f^{RX-BS} = \left(1 + \frac{r \cdot v}{|r|c}\right)f^{REF}\alpha^{RL} =$$
$$\left(1 + \frac{r \cdot v}{|r|c}\right)\left(1 + \frac{r \cdot v}{|r|c}\right)f_c^{FL}\frac{\alpha^{RL}}{\alpha^{FL}}$$
$$= \left(1 + 2\frac{r \cdot v}{|r|c} + \left(\frac{r \cdot v}{|r|c}\right)^2\right)f_c^{FL}\frac{\alpha^{RL}}{\alpha^{FL}} \approx$$
$$\left(1 + 2\frac{r \cdot v}{|r|c}\right)f_c^{FL}\frac{\alpha^{RL}}{\alpha^{FL}}$$

$$\left(\frac{r \cdot v}{|r|c}\right)^2 \approx 0$$

since $v^2 \ll c^2$. To prove this assumption, assuming 1000 km/h at 2.4 GHz, $$\left(\frac{r \cdot v}{|r|c}\right)^2 f_c = 0.002 \text{ Hz}.$$

This is an insignificant contribution and can be ignored.

In TDD (time division duplex), $a^{FL}=a^{RL}$ and $f_c^{FL}=f_c^{RL}=f_c$, which implies that $\Delta f^{FL}=\Delta f^{RL}=\Delta f$, and thus $f^{RX-BS}=f_c+2\Delta f$.

Note that in FDD (frequency division duplex) (or TDD), $$f_c^{RL} = f_c^{FL}\frac{\alpha^{RL}}{\alpha^{FL}},$$

thus $$f^{RX-BS} = \left(1 + 2\frac{r \cdot v}{|r|c}\right)f_c^{RL} = f_c^{RL} + 2\Delta f^{RL}$$

Therefore, just like in the TDD case we need to compensate the transmission by $2\Delta f^{RL}$.

As shown through the above examples, the present technique allows the frequency of a signal transmitted by a wireless communication system installed in a fast-moving vehicle to be adjusted to compensate for the Doppler effect. This reduces interference effects at a ground terminal (base station), and allows higher frequency signals (such as those used in modern telecommunications Standards) to be used. It also allows the system to be used in vehicles of increasing speeds. Thus, modern telecommunications Standards such as 4G (LTE) can be implemented in ATG systems, even as the speeds with which modern aeroplanes travel are ever-increasing.

One of the functions performed by the communication control circuitry 110 is to perform a sign-on procedure to seek to establish a communication link with the ground terminal 130. During that sign-on procedure, the communication control circuitry 110 will issue a connection setup signal for receipt by the further antenna system 135 within an identified timing window. The vehicle terminal 100 will firstly receive an initial signal from the ground terminal 130 advising of the availability for the connection setup signal to be issued, and providing information regarding the identified timing window. The timing window will typically occupy one or more sub-frames, and the connection setup signal will have a duration less than the identified timing window, but will need to be received in its entirety within that timing window in order for a connection to successfully be established.

In accordance with the techniques described herein, it is assumed that communications are taking place in accordance with the 4G (LTE) Standard, and such a connection setup signal may be referred to as a RACH (random access channel) signal that is issued in a random access channel during an uplink communication from the moving vehicle to the ground terminal. Different RACH configurations may be supported, for example associated with different sized RACH signals and associated different sized timing windows.

Figure 10A:
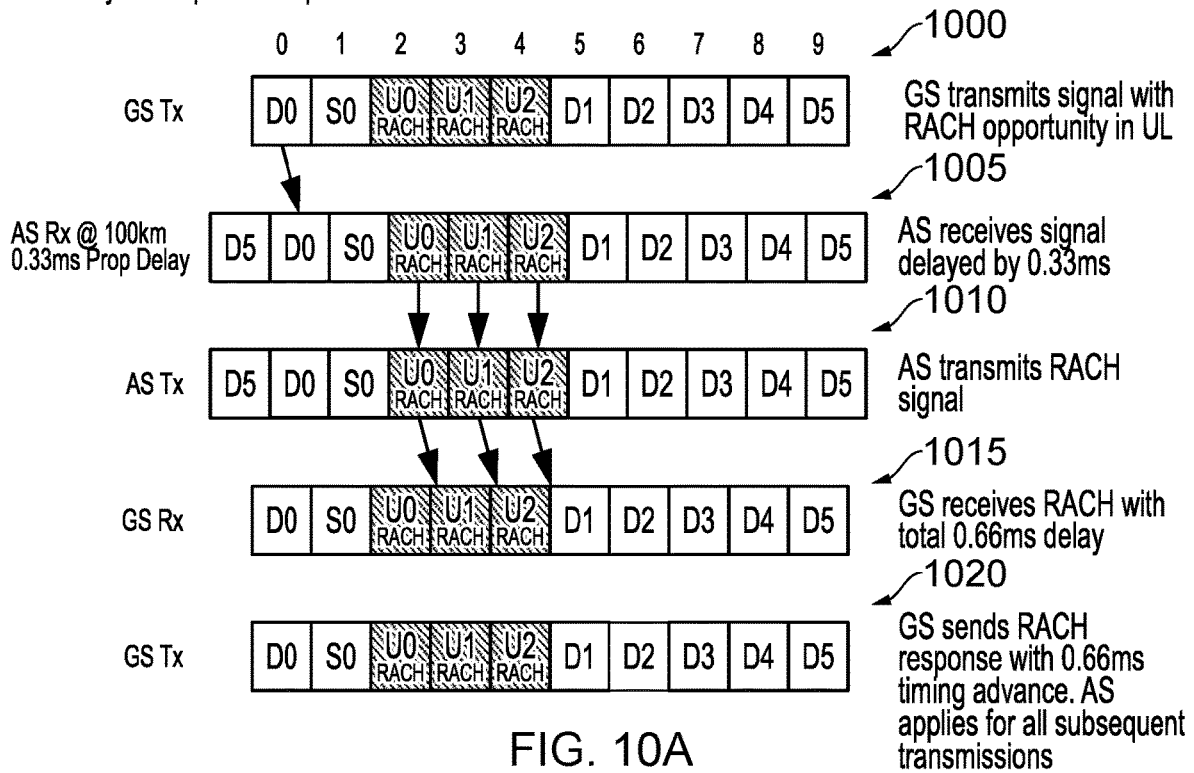
FIG. 10A illustrates how a connection setup signal (a RACH signal) can be successfully communicated from a vehicle terminal to a ground terminal using the communication frame of FIG. 2 provided the vehicle terminal is no more than 108 km from the ground terminal.

FIG. 10A illustrates an example form of RACH configuration that could be used when adopting the communication frame format of FIG. 2, and in situations where the separation between the aircraft 10 and the ground terminal 20 does not exceed 108 km. Here the timing window occupies three sub-frames. As indicated by the communication frame 1000, it is assumed that the ground station 20 transmits a signal identifying that there is a RACH opportunity that the aircraft can utilise in an uplink communication back to the ground terminal 20. As shown by the line 1005 in FIG. 10A, the receipt of the communication frame at the aircraft 10 is delayed by approximately 0.33 ms, due to the separation between the aircraft and the ground terminal (in this case it being assumed that there is essentially the maximum separation that can be supported using this RACH format). As shown by the line 1010, it is assumed that the aircraft 10 then transmits the RACH signal, in this case the RACH signal being propagated across all three of the uplink communication sub-frames.

It will be appreciated that that uplink transmission will also be delayed by the same propagation delay, and hence will be received by the ground terminal 20 at approximately 0.66 ms delay (as indicated by the line 1015), due to the round trip delay between the ground terminal and the aircraft. However, the timing control at the ground terminal is fixed, and hence it will assume the timing of the sub-frames is aligned with the initial timing shown by the entry 1000. Hence, it will interpret the received information on that basis.

In this case it is assumed that the RACH signal is received entirely within the RACH timing window, and based on the relative offset of that RACH signal, the ground station 20 can identify that the total propagation delay is 0.66 ms. Accordingly, in a subsequent communication frame 1020 where the ground station provides a response to identify that a successful communication link has been established, that response signal from the ground station will identify that the aircraft should advance its timing for subsequent uplink communication by 0.66 ms. As a result, this will ensure that the subsequent uplink communication is aligned with the sub-frame timing boundaries as implemented by the ground terminal 20.

Figure 10B:
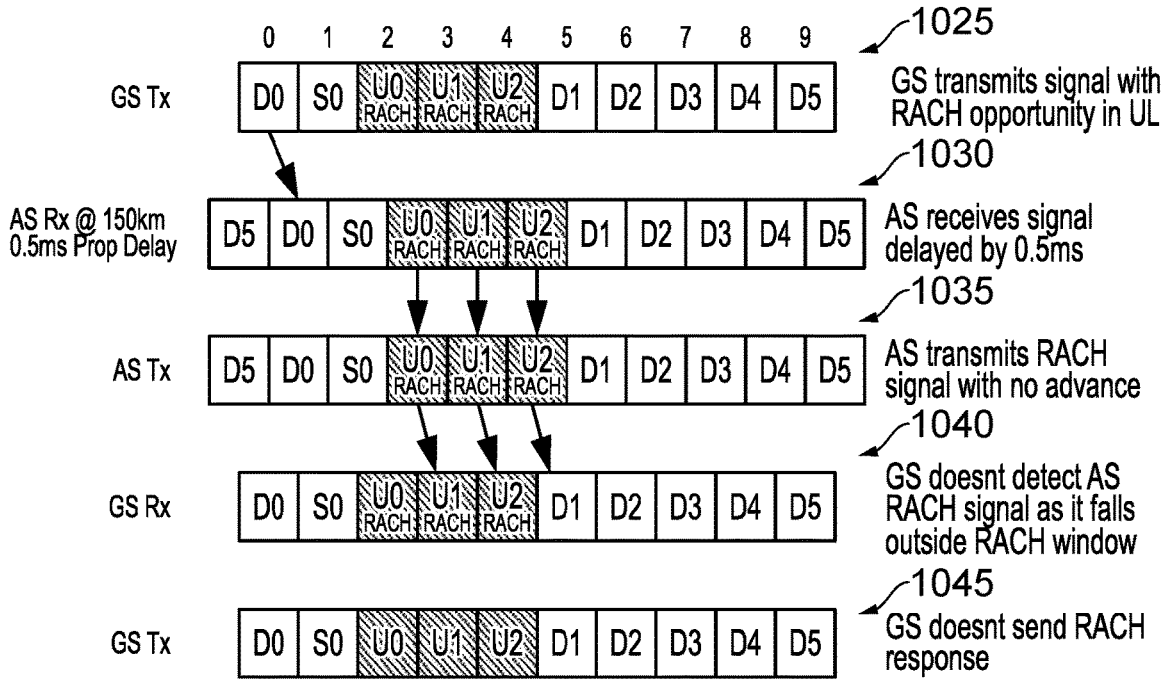
FIG. 10B illustrates how when the distance between the vehicle terminal and the ground terminal exceeds 108 km the connection setup signal will not be successfully received by the ground terminal when adopting the scheme of FIG. 10A.

FIG. 10B illustrates the use of the same example RACH configuration, but in a situation where the separation exceeds the maximum separation distance of 108 km. In this specific example, it is assumed that the separation is 150 km resulting in a 0.5 ms propagation delay from the ground terminal 20 to the aircraft 10. As shown by the line 1025, the ground terminal 20 emits the same initial signal as discussed earlier with reference to the line 1000 of FIG. 10A, and hence identifies a RACH opportunity. However, as shown by the line 1030, the communication frame is received after a 0.5 ms propagation delay. Again, as indicated by the line 1035, the aircraft terminal transmits the RACH signal within the uplink sub-frames, but again the communication is delayed by another 0.5 ms on its transit to the ground terminal. Hence, there has been an overall delay of 1 ms, and this results in the RACH signal not falling within the RACH timing window, when using the timing adopted by the ground station 20, as indicated by the line 1040. Accordingly, as indicated by line 1045, the RACH signal has not been successfully received, and the ground station 20 will not send a response to the aircraft, as a result of which a communication link will not be established.

In accordance with the techniques described herein, this problem is addressed by enabling the vehicle terminal to assess the separation between it and the ground terminal with which it is seeking to establish a communication, and to apply an initial timing advance relative to the default time indicated for the RACH signal, when issuing that RACH signal to the ground terminal. This can be used to ensure that the RACH signal is received within the specified timing window, hence enabling a successful communication link to be established. This process is discussed in more detail with reference to the flow diagram of FIG. 11.

Figure 11:
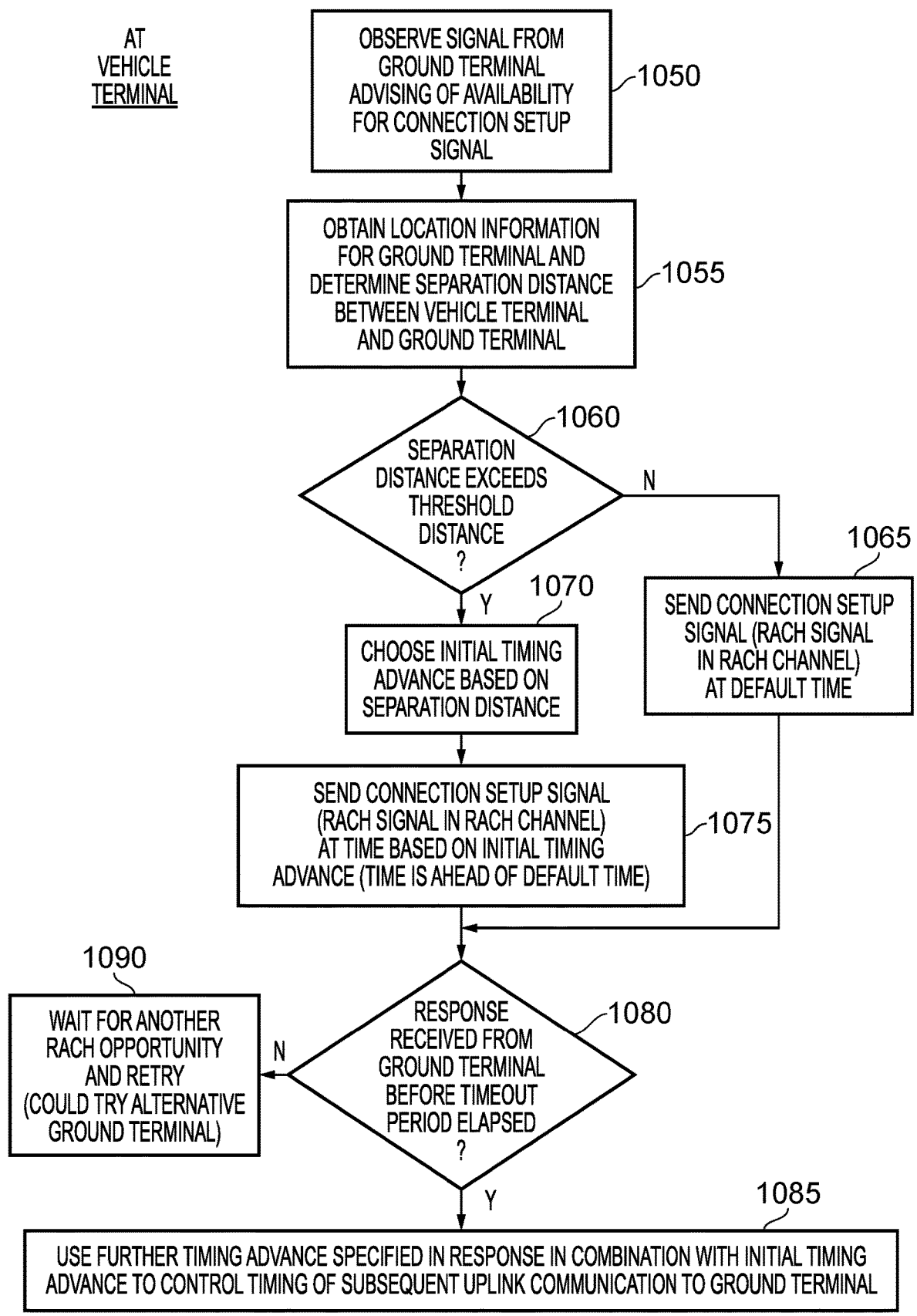
FIG. 11 is a flow diagram illustrating a process performed by the vehicle terminal in accordance with one example implementation, in order to ensure that the connection setup signal is successfully received by the ground terminal within an identified timing window even when the distance exceeds a setup threshold distance.

As shown in FIG. 11, at step 1050 the vehicle terminal 100 observes a signal from the ground terminal 130 advising of the availability for the issuance of a connection setup signal (a RACH signal). This information received by the vehicle terminal 100 also provides information about the default timing for issuing the RACH signal, the format of the RACH signal, and the format of the timing window.

At step 1055, the distance computation circuitry 120 obtains the location information for the ground terminal, and determines a separation distance between the vehicle terminal and the ground terminal. As discussed earlier, the distance computation circuitry 120 may refer to the storage 125 in order to obtain the coordinates of the ground terminal, based on that ground terminal's identifier included within the communication from the ground terminal, and can obtain information about the location of the vehicle terminal from the GPS receiver 115, hence enabling the separation distance to be determined.

At step 1060, it is determined whether the separation distance exceeds a setup threshold distance. If it does not, then the process proceeds to step 1065, where the connection setup signal is sent in the standard manner at the default timing, as per the process discussed for example earlier with reference to FIG. 10A. The setup threshold distance will depend on the RACH configuration used, i.e. the format of the RACH signal, and the size of the timing window, and the setup threshold distance will be determined not to have been exceeded if the separation distance is such that the RACH signal will be successfully received by the ground station if merely transmitted at the default timing specified by the signal received at step 1050.

However, if at step 1060 it is determined that the separation distance exceeds the setup threshold distance, then at step 1070 an initial timing advance is chosen based on that separation distance. There are a number of ways in which that initial timing advance can be determined, and one approach will be discussed later with reference to FIG. 14.

Once the initial timing advance has been determined at step 1070 then at step 1075 the RACH signal is sent in the RACH channel at a timing based on the initial timing advance. In particular, the default time is adjusted by the initial timing advance so that the RACH signal is issued ahead of the default time.

Due to the way in which the timing advance is chosen at step 1070, it will hence be ensured that the RACH signal will be received within the RACH timing window by the ground station 130 even though the separation distance exceeds the setup threshold distance.

Following either step 1065 or step 1075, the process proceeds to step 1080, where the vehicle terminal 100 waits to see if a response is received from the ground terminal before a timeout period has elapsed. In particular, even though the RACH signal will have been received within the required timing window, it is not guaranteed that the ground terminal will choose to establish a communication link with the vehicle terminal. For example, it may be that the vehicle terminal is contending with a number of other vehicle terminals to establish a communication link, and the ground terminal may choose to establish a communication link with one or more of those other vehicle terminals instead of the current vehicle terminal. For instance, certain vehicle terminals may be given priority over others, and hence it may be that the vehicle terminal being considered in FIG. 11 does not obtain a communication link at that time.

If the ground terminal chooses not to establish a communication link, it will not send a response back to the vehicle terminal, and accordingly if such a response is not received within a certain timeout period, the process proceeds to step 1090 where the vehicle terminal will wait to retry establishing a communication link.

It may be that at step 1090 the vehicle terminal waits for another RACH opportunity to be identified by the same ground terminal, and then retries establishing a communication link with that ground terminal. It could at that time take certain steps to increase the likelihood of it being allocated a communication link, such as for example increasing the power of the transmission so as to indicate to the ground terminal that a better quality communication link could be established. For example, in one implementation, the vehicle terminal estimates path loss and computes an initial RACH power for detection, selects a preamble from an available set of preambles and transmits it. If that RACH request is not successful, the vehicle terminal may autonomously choose another random preamble and increase its power for the next RACH opportunity. This can continue until the vehicle terminal's maximum transmit power has been reached.

However, the vehicle terminal is not limited to retrying to make a connection with the same ground terminal, and if it receives an initial signal from another ground terminal providing a connection setup opportunity, it could then seek to repeat the process of FIG. 11 in order to establish a link with that ground terminal.

If at step 1080 it is determined that a RACH response is received from the ground terminal, hence identifying that the ground terminal has accepted the establishment of a communication link with the vehicle terminal, then the communication control circuitry 110 within the vehicle terminal 100 will analyse the response in order to determine how to control subsequent communication with the ground terminal. In particular, a further timing advance may be specified in the response which should be used in combination with the initial (coarse) timing advance chosen at step 1070 to control the timing of subsequent uplink communication to the ground terminal. In addition, the response will typically provide information about which sub-frames are allocated to the vehicle terminal for downlink and uplink communications, so that the vehicle terminal can receive downlink communications destined for it as issued by the ground terminal 130, but can also issue its uplink communications within an appropriate sub-frame, using the cumulative timing advance determined at step 1085 so as to ensure that those uplink communications are received at the appropriate timing by the ground terminal 130.

It should be noted that while the information in the RACH response is used to provide a fine timing advance that can be combined with the coarse timing advance to determine the actual timing advance to be used for a subsequent uplink communication, as time progresses after the communication link has been established the distance between the aircraft and the ground terminal will change. This change can be compensated for using standard techniques provided by the 4G (LTE) Standard to make fine timing adjustments during the duration of the communications link.

Figure 12A:
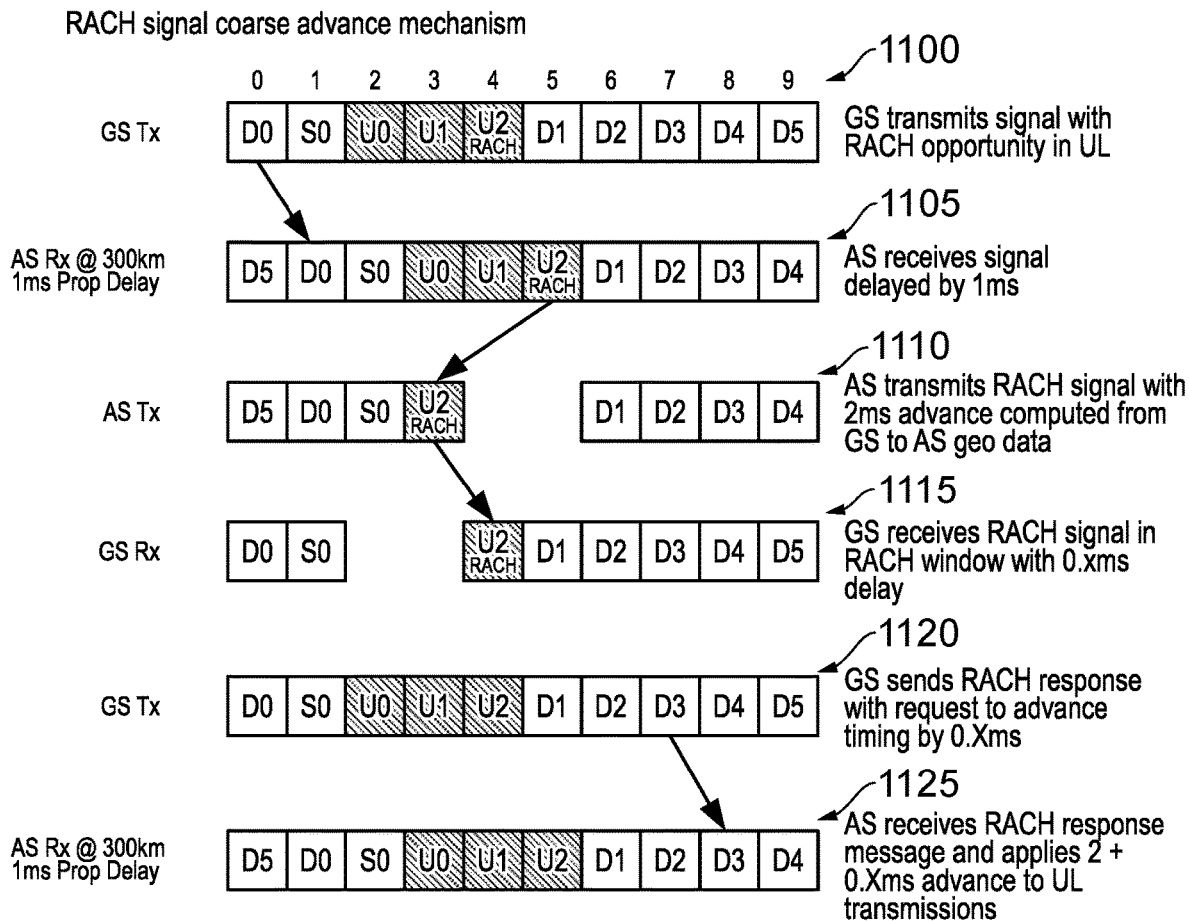
FIGS. 12A and 12B illustrate how the approach described in FIG. 11 ensures correct reception of the connection setup signal, and enables the provision of a suitable response from the ground terminal that allows a correct timing advance to be applied for future uplink communication to the ground terminal.

FIG. 12A illustrates how the process of FIG. 11 is applied for a particular implementation of the RACH signal and RACH timing window. In this example, it assumed that the RACH timing window is specified as coinciding with the third uplink communication sub-frame (U2), and that the RACH signal as transmitted will need to land entirely within that sub-frame in order for a successful communication to be established. As indicated by the line 1100, the ground station transmits a signal identifying the RACH opportunity that can be used within the uplink path. As indicated by the line 1105, due to the separation between the ground terminal 130 and the vehicle terminal 100, which in this case is assumed to be the maximum allowable distance of 300 km, the vehicle terminal 100 receives the communication frame delayed by 1 ms, and hence the communication frame is offset by a sub-frame width.

As indicated by the line 1110, because the separation distance exceeds the setup threshold distance at step 1060, an initial timing advance is chosen at step 1070 based on the separation distance, and in this case that initial timing advance will be chosen to be 2 ms. A full 2 ms advance can be applied without risk of violating a receive/transmit timing constraint, since even when the RACH signal is advanced by 2 ms, the vehicle terminal is not seeking to transmit that RACH signal at a time when it should be configured for receiving downlink communication, as is evident by the line 1110.

As indicated by the line 1115, that RACH signal will then actually be received with a 1 ms delay relative to its transmission time, which then realigns the RACH signal with the RACH timing window. Accordingly, the connection setup signal (the RACH signal) will be received, and accordingly a communication link can be established.

Assuming the ground terminal determines that a communication link is to be established with the vehicle terminal, then it will transmit a communication frame 1120 as a RACH response, which will be received with a 1 ms delay, as indicated by the line 1125. This can specify a fine timing advance if needed, which can be applied in combination with the coarse timing advance applied by the vehicle terminal to control subsequent uplink communications. The RACH response will also typically provide an indication of which sub-frames are allocated to the vehicle terminal for subsequent downlink and uplink communications.

Figure 12B:
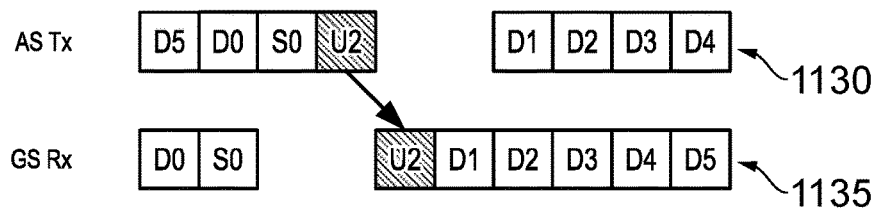

As indicated in FIG. 12B, it is assumed in this instance that the vehicle terminal is allocated as its uplink sub-frame the sub-frame U2, and will accordingly perform an uplink transmission at a timing indicated by the line 1130 for its subsequent uplink communications. As indicated by the line 1135 in FIG. 12B, due to the timing advance applied, this will ensure that the uplink communication is actually received at the correct timing by the ground terminal 130.

It should be noted that whilst in FIG. 12A it is assumed that the RACH configuration specifies that the RACH timing window is associated with the U2 sub-frame, as discussed earlier different RACH configurations can be used. For example, a RACH configuration may be used where the timing window is associated with both the U1 and the U2 sub-frames, with a longer RACH signal being issued, but with the requirement that a RACH signal lands in its entirety within the U1 and U2 sub-frames as per the timing adopted by the ground terminal 130. In another example, the RACH configuration may specify the use of all three uplink sub-frames as the RACH timing window, again with a longer RACH signal, but again with the requirement that that RACH signal lands entirely within the timing window as per the timing adopted by the ground terminal 130. The choice of RACH configuration will affect the setup threshold distance that is assessed at step 1060 of FIG. 11, and may affect the initial timing advance that is then chosen at step 1070 in situations where the distance exceeds the setup threshold distance.

For instance, whilst in the example of FIG. 12A the initial timing advance chosen based on the separation distance does not have to be constrained to take into account the requirement not to violate a receive/transmit timing constraint, with other RACH configurations the initial timing advance chosen may need to be constrained so as to ensure that the receive/transmit timing constraint is not violated. For example, it will be appreciated that if the RACH timing window occupies both the U1 and the U2 sub-frames, and a 2 ms advance was applied as per the example shown in FIG. 12A based on a separation distance of 300 km, this means that the transmission of the RACH signal will overlap with the S0 sub-frame. However, the receive/transmit timing constraint would then be violated if such an advance resulted in the need to transmit an uplink signal whilst the antenna system 105 should still be configured for downlink communication. In addition to the fact that it takes a finite time to perform the switch, as mentioned earlier it is also possible that some of the first symbols within the S0 sub-frame may be used for downlink communication, and accordingly in that instance it may not be appropriate to fully advance the initial timing by the timing that would be determined based purely on the propagation delay. Instead, it may be necessary to choose a slightly smaller coarse timing advance to avoid violating the receive/transmit timing constraint, whilst ensuring that that timing advance is sufficient to cause the RACH signal to be received within the RACH timing window. The further timing advance determined by the ground terminal will then compensate for the initial timing advance, so that cumulatively the initial and further timing advances will provide the required timing advance for subsequent uplink communication.

Figure 13:
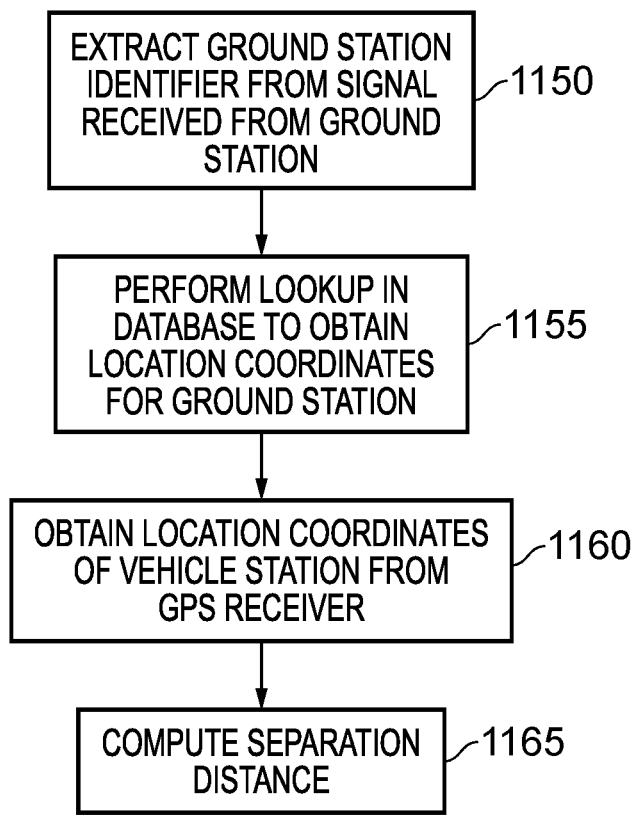
FIG. 13 is a flow diagram illustrating how step 1055 of FIG. 11 may be performed in accordance with one example implementation.

FIG. 13 is a flow diagram illustrating one way in which step 1055 of FIG. 11 may be performed. In this example, it is assumed that the initial communication from the ground station includes a ground station identifier. At step 1150, the distance computation circuitry 120 extracts that ground station identifier from the received signal, and then at step 1155 performs a lookup in the database provided within the storage 125 in order to obtain the location coordinates for the ground station.

At step 1160, the distance computation circuitry 120 then obtains location coordinates of the vehicle terminal 100 from the GPS receiver 115, and thereafter at step 1165 computes the separation distance between the ground terminal and the vehicle terminal.

Whilst the approach of FIG. 13 can be used in one example implementation, in an alternative implementation it may be that the initial signal from the ground terminal directly provided the coordinates of the ground terminal, and accordingly those coordinates could be extracted from the received signal at step 1150, and no lookup in the database would be required (hence step 1155 becoming redundant).

Figure 14:
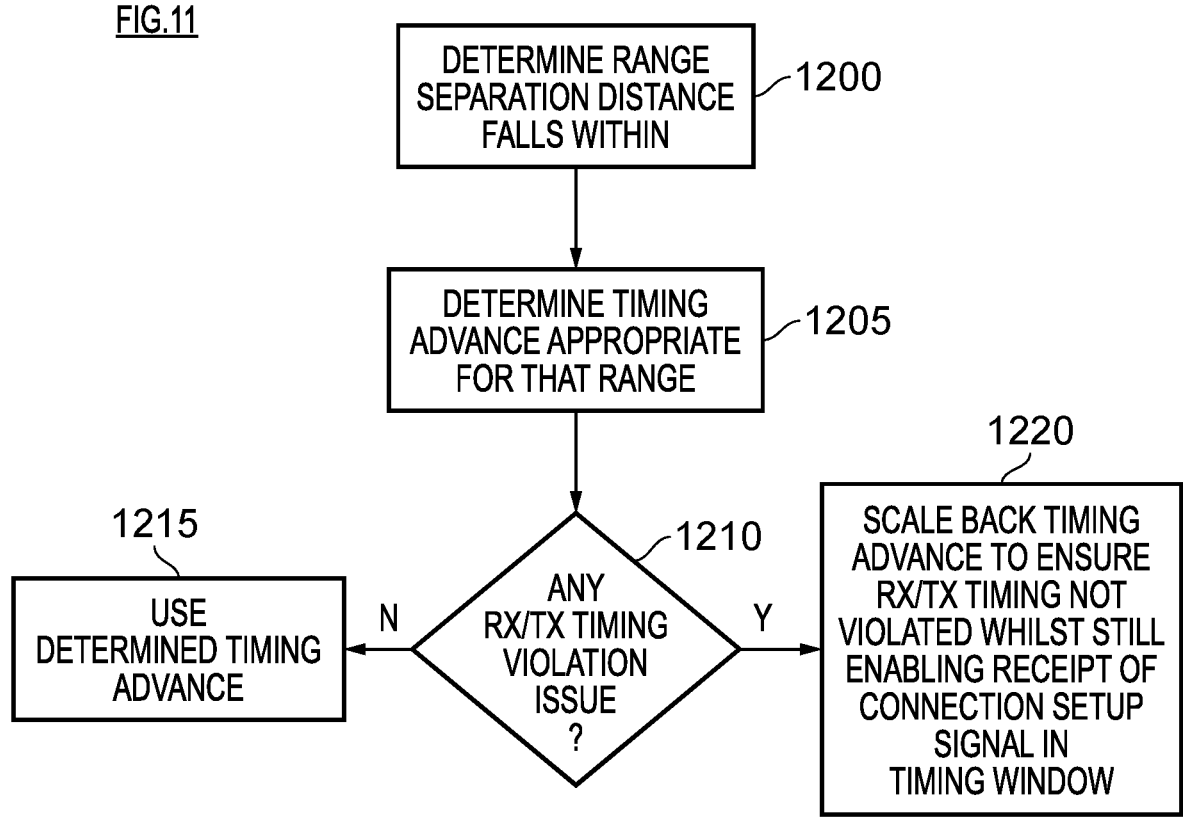
FIG. 14 is a flow diagram illustrating how step 1070 of FIG. 11 may be performed in one example implementation.

FIG. 14 is a flow diagram illustrating how step 1070 of FIG. 11 may be performed in one example implementation. At step 1200, it is determined which range of separation distances the separation distance falls within. Then, at step 1205 a timing advance appropriate for that range is determined. For instance, it could be that a lookup table is used that provides suitable coarse timing advances to be used for each of a number of different ranges. That lookup table could provide timing advances applicable for a number of different RACH configurations (i.e. for different formats of RACH signal and RACH timing window), with the lookup operation obtaining the timing advance appropriate for the determined range and RACH configuration.

However, in some implementations it may be determined that a lookup table approach based on ranges is not required, and instead the separation distance may be determined on the fly. In particular, an initial timing advance can be determined by dividing the separation distance by the speed of light.

As shown in FIG. 14, the process then proceeds to step 1210, where it is determined whether there is any receive/transmit timing violation issue. As discussed earlier, this may depend on the RACH configuration used and the separation distance in question. In particular, for RACH configurations that use multiple sub-frames, it may be the case that when the separation distance exceeds a certain amount, then there could be a receive/transmit timing violation issue if the timing advance determined at step 1205 was used "as is".

If it is determined that there is not any receive/transmit timing violation issue, then the process proceeds to step 1215 where the determined timing advance evaluated at step 1205 is used.

However, if it is determined that there is a receive/transmit timing violation issue, then at step 1220 the timing advance can be scaled back to ensure that the receive/transmit timing constraint is not violated, whilst still enabling receipt of the connection setup signal within the timing window.

In instances where the timing advance is encoded within a lookup table based on ranges of separation distance, then as mentioned earlier in one example implementation that lookup table will provide timing advance information for each of a number of different possible RACH configurations, and the prospect of violating receive/transmit timing constraints can be taken into account when populating the lookup table, so that in effect the evaluation at step 1210 is taken into account when initially populating the lookup table. In that event it will merely be sufficient to determine the range that the separation distance falls within and then obtain the appropriate timing advance to use from the lookup table at step 1205. Hence, in that case steps 1210, 1215 and 1210 would not be needed.

In one example implementation, when determining the appropriate timing advance to use, the aim is to try and land the connection setup signal within the middle of the specified timing window. By such an approach, this can allow for any inaccuracy in the timing advance applied, to ensure not only that the entire connection setup signal is received before the end of the timing window, but also that no portion of that connection setup signal is received before the start of the timing window.

It should be noted that the above coarse timing advance scheme can be applied to a wide variety of different communication schemes, for instance both TDD (time division duplex) and FDD (frequency division duplex) schemes. When employing an FDD scheme, the above-mentioned receive/transmit timing constraint issue may not apply as the antenna system can transmit and receive simultaneously, and hence steps 1210 and 1220 of FIG. 14 will not be employed.

Figure 15:
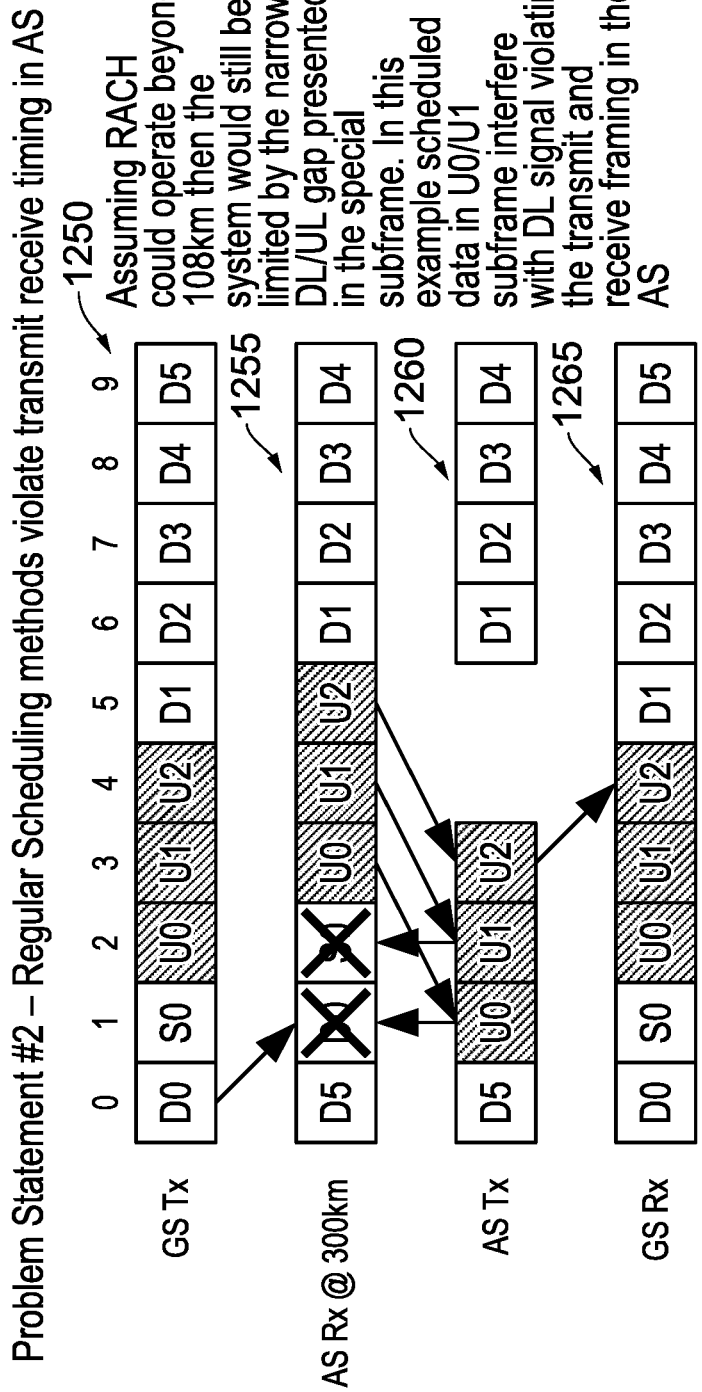
FIG. 15 is a diagram schematically illustrating a scheduling issue that can arise when the vehicle terminal is separated from the ground terminal by a distance exceeding a scheduling threshold distance.

Using the above described techniques, it is possible to establish a communication link with the ground terminal, even in situations where the separation distance between the aircraft 10 and the ground terminal 20 exceeds that supported using the standard RACH mechanism. However, as illustrated schematically in FIG. 15, a further problem that can arise is ensuring that in the subsequent uplink communications from the aircraft to the ground station 10 (using the cumulative timing advance obtained by combining the initial timing advance chosen by the vehicle terminal 100 with the fine timing advance specified in the RACH response), the earlier-mentioned receive/transmit timing constraint is not violated. In particular, as shown in FIG. 15, the communication frame format provides multiple sub-frames that can in principle be used for uplink communication, namely the sub-frames U0, U1 and U2 shown in the communication frame 1250. However, as indicated by the combination of the lines 1255 and 1260, if the scheduling circuitry 140 within the ground terminal 130 chooses to allocate resource blocks to the aircraft 10 within either the U0 or the U1 sub-frames, then if the aircraft separation distance from the ground terminal exceeds a scheduling threshold distance (in this example the scheduling threshold distance being 100 km), then the receive/transmit timing constraint would be violated.

In the example of FIG. 15, it is assumed that the separation distance between the aircraft 10 and the ground terminal 20 is 300 km, and hence from the earlier discussed FIG. 12A it will be understood that a timing advance of approximately 2 ms may be specified. However, this would overlap the sub-frames U0 and U1 with the downlink sub-frame D0 and the special sub-frame S0, and as discussed earlier the special sub-frame S0 may include some symbols transmitting downlink information. At any point in time, the antenna system 105 can only be configured for downlink communication or uplink communication, so this would violate the receive/transmit timing constraint, even though, as indicated by the line 1265, that timing advance would correctly align the uplink communications so that they are received in the relevant sub-frames U0, U1, U2 as per the timing employed by the ground terminal 130.

Figure 16A:
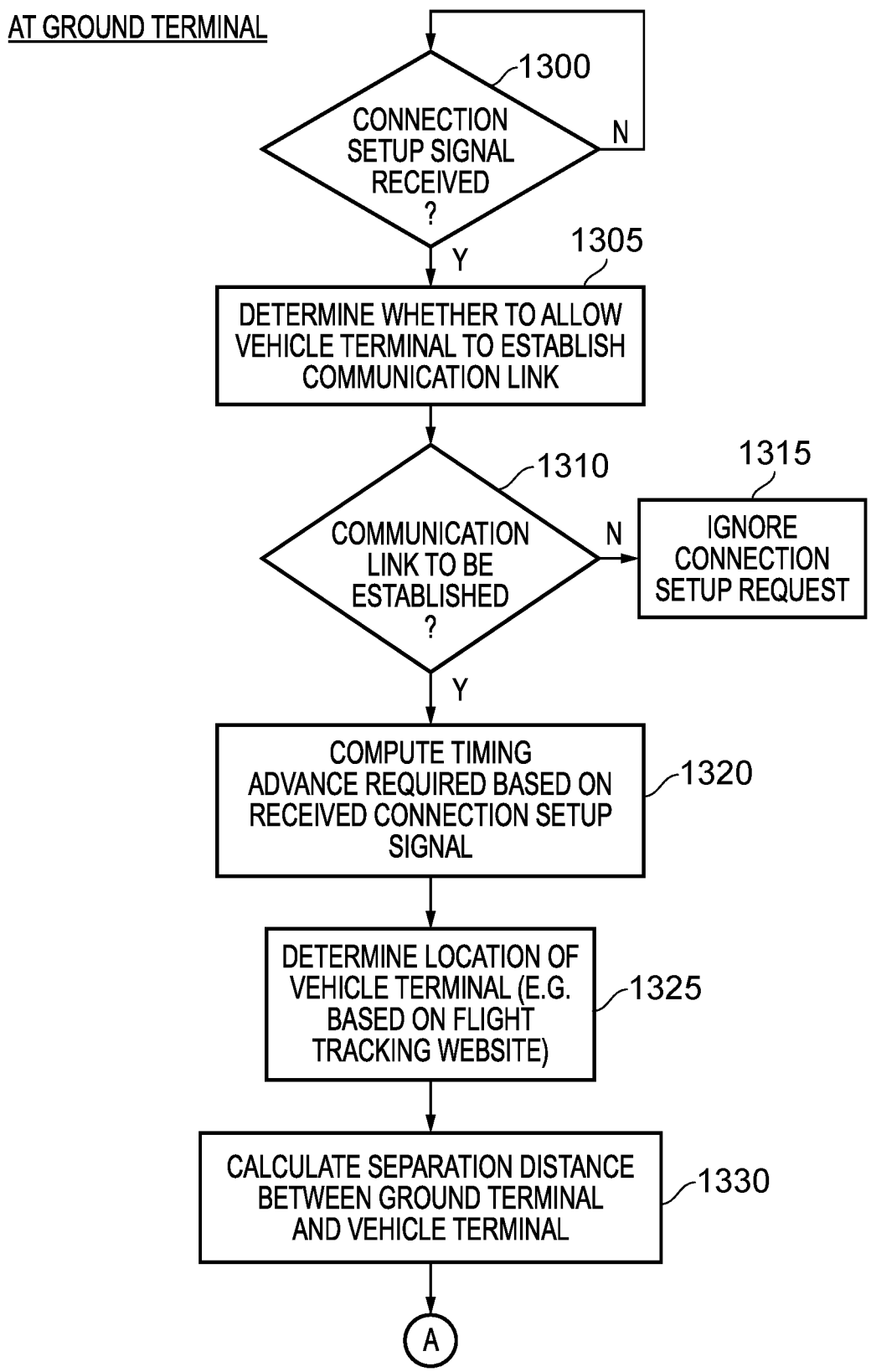
FIGS. 16A and 16B are a flow diagram illustrating a process performed by the ground terminal in order to resolve the scheduling issue illustrated in FIG. 15, in accordance with one example arrangement.
Figure 16B:
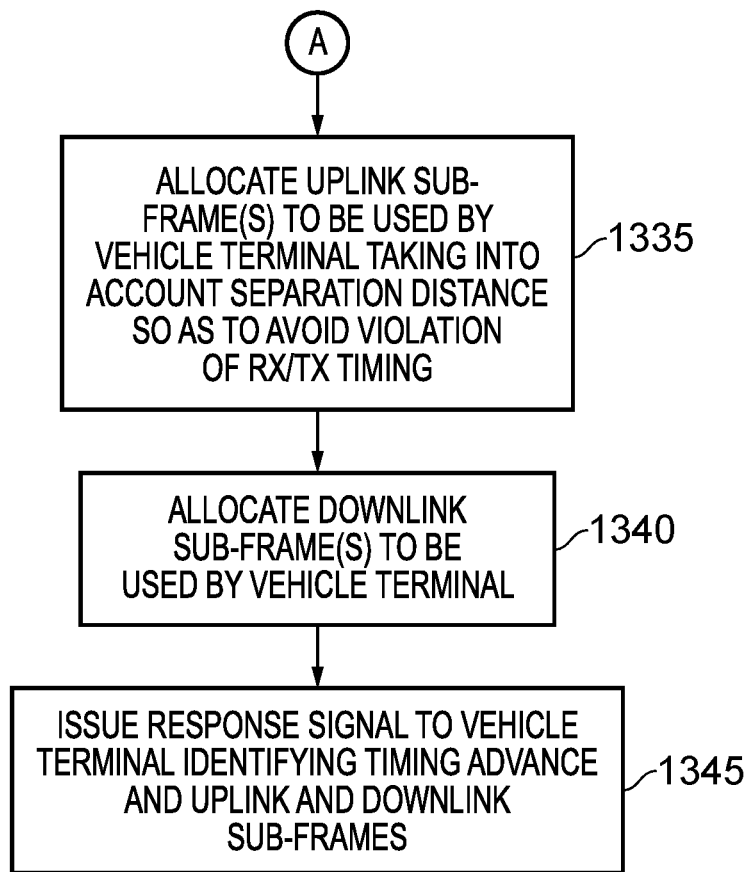

FIGS. 16A and 16B provide a flow diagram illustrating steps that can be performed by the ground terminal when determining how to schedule sub-frames to the vehicle terminal, in order to resolve the issue illustrated in FIG. 15. At step 1300, the ground terminal will await receipt of a connection setup signal, i.e. the earlier discussed RACH signal, from the vehicle terminal. Then, at step 1305 the ground terminal determines whether to allow the vehicle terminal 100 to establish a communication link with it. As discussed earlier, a number of criteria can be assessed here. For example, the quality of the communication link can be assessed, and factors such as other vehicle terminals that are seeking to establish a communication link can be considered when deciding whether to accept the establishment of a communication link with the vehicle terminal 100.

At step 1310, it is then concluded whether a communication link is to be established or not, and if not then at step 1315 the connection setup request is merely ignored. As will be apparent from the earlier discussed FIG. 11, this will result in no response being received by the vehicle terminal within a specified timeout period, and accordingly the vehicle terminal will proceed to step 1090 in order to seek to establish a communication link at a future time, either with that ground terminal 130, or with another ground terminal.

Assuming it is decided at step 1310 that a communication link is to be established, then at step 1320 the communication link establishing and scheduling circuitry 140 computes a timing advance required based on the received connection setup signal. In particular, based on the placement of the received RACH signal within the RACH timing window, a timing advance can be computed, this being the fine timing advance discussed earlier. At this stage, the computation performed by the communication link establishing and scheduling circuitry 140 does not need to take account of the actual separation distance between the aircraft and the ground terminal, since as discussed earlier that fine timing advance will be combined with any coarse timing advance initially chosen by the aircraft when sending the RACH signal, in order to determine the full timing advance to be used for subsequent uplink communication.

However, as discussed earlier care needs to be taken when scheduling uplink sub-frames for the aircraft to ensure that the receive/transmit timing constraint is not violated, and to assist in this process the ground terminal 130 does need to determine the separation between the vehicle terminal 100 and the ground terminal.

Accordingly, at step 1325 the ground terminal is arranged to determine the location of the vehicle terminal. In particular, the distance computation circuitry 145 discussed earlier in FIG. 3 can access information in order to determine the current position of the aircraft 10. There are a number of ways in which the vehicle location information can be obtained, but in one example a flight tracking website may be accessed in order to obtain current coordinate information. Thereafter, at step 1330 the separation distance between the ground terminal and the vehicle can be determined. In particular, the location of the ground terminal 130 will be fixed, and accordingly can be used when computing the separation distance.

Then, at step 1335, one or more uplink sub-frames are allocated for use by the vehicle terminal taking into account the separation distance, so as to avoid violation of the receive/transmit timing constraint. In particular, in one example arrangement there may be multiple sub-frames that can be allocated for uplink communication, such as the three sub-frames U0, U1, U2 discussed earlier. Which of those sub-frames is used when allocating uplink resource for the aircraft 10 can take account of the separation distance. This will be discussed in more detail later by way of example with reference to FIGS. 17A to 17C. However, from the earlier-discussed FIG. 15, it will be appreciated that in the particular example chosen in FIG. 15 the scheduling circuitry could avoid allocating resource blocks within the sub-frames U0 and U1, so that the aircraft is only allocated resource blocks within the sub-frame U2, such that when the timing advance is applied the receive/transmit timing constraint will not be violated.

As indicated at step 1340, downlink sub-frames are also allocated to be used by the vehicle terminal for downlink communication from the ground station to the aircraft.

Once the uplink and downlink sub-frames have been allocated, then the response signal can be issued to the vehicle terminal at step 1345 identifying both the timing advance determined earlier at step 1320, and the uplink and downlink sub-frames that are to be used for subsequent communication with the aircraft.

Figure 17A:
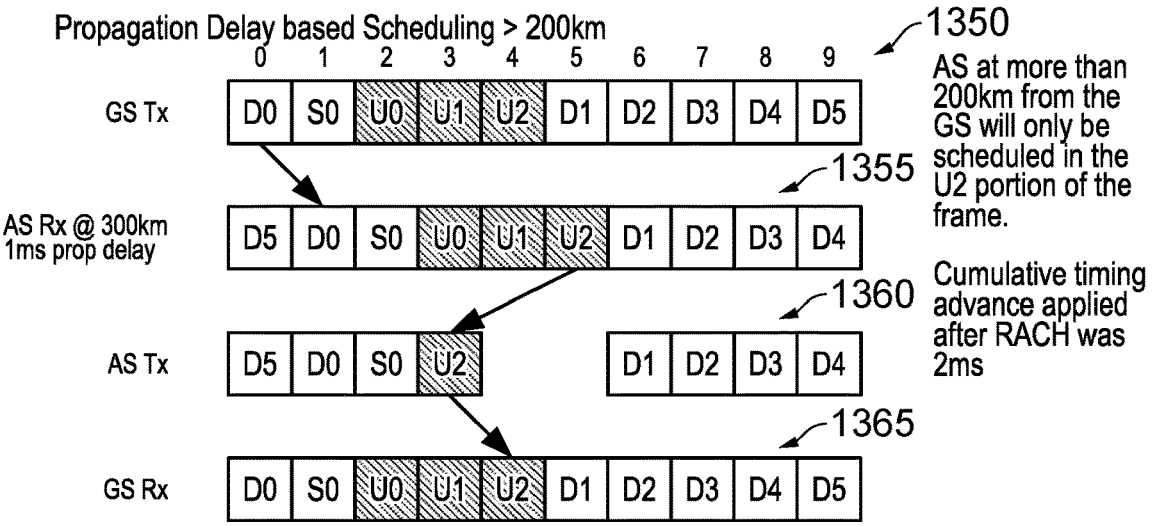
FIGS. 17A to 17C illustrate how the process of FIGS. 16A and 16B may be applied for various separation distances between the vehicle terminal and the ground terminal, in accordance with one example arrangement.
Figure 17B:
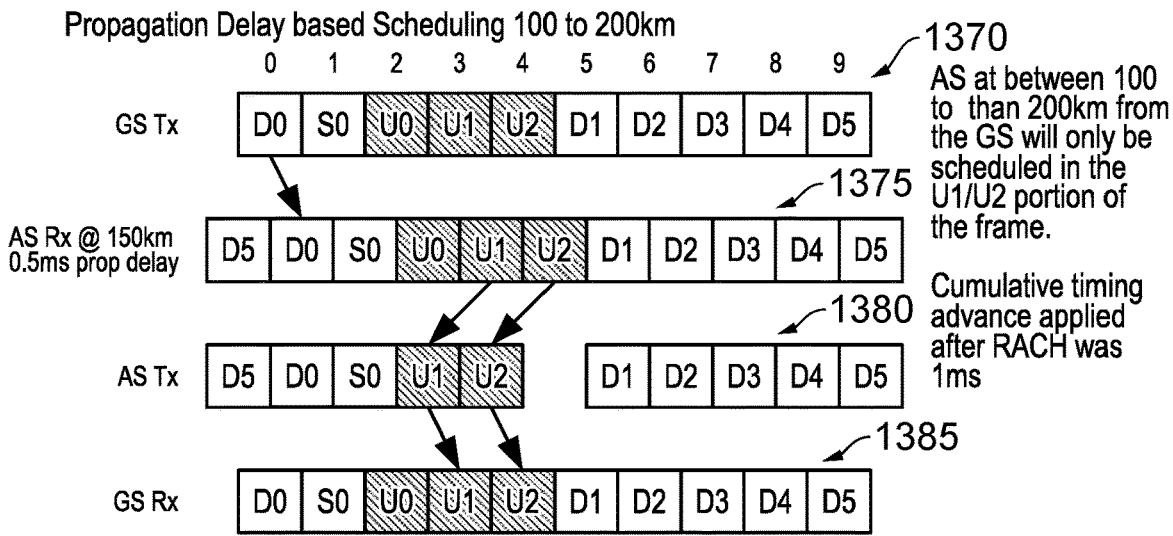
Figure 17C:
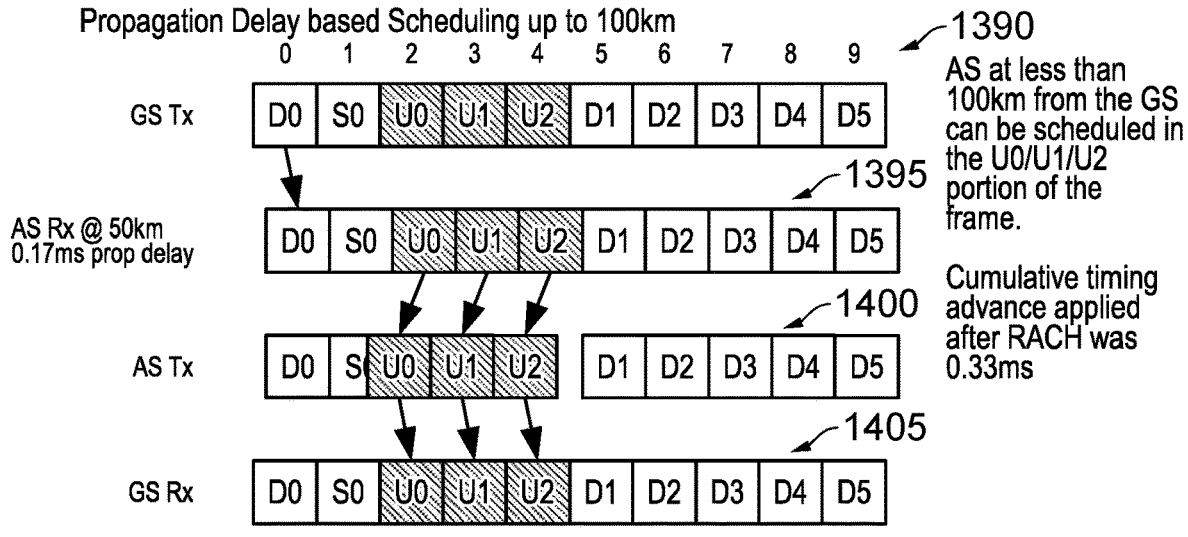

FIGS. 17A to 17C illustrate how uplink resource can be scheduled, assuming the communication frame format is as discussed earlier in FIG. 2, and accordingly there are three sub-frames that can in principle be used for uplink communication. As indicated in FIG. 17A, where it is determined that the aircraft 10 is at 300 km from the relevant ground terminal 20, the propagation delay is 1 ms, and accordingly the communication frame 1350 as transmitted by the ground terminal is received as shown by the line 1355, such that the communication is one sub-frame out relative to the transmission timing. In this example, it is assumed that the scheduling circuitry determines at step 1335 to allocate the U2 sub-frame to the vehicle terminal for use in uplink communication. As a result, as indicated by the line 1360, when the cumulative timing advance of 2 ms is applied, the downlink/uplink timing constraint is not violated. Hence, the uplink communication can be performed using this timing advance, and will ensure that it is correctly received by the ground terminal in the U2 sub-frame, as indicated by the line 1365. The approach shown in FIG. 17A can be used wherever the separation distance exceeds 200 km, provided the separation distance does not exceed 300 km.

FIG. 17B illustrates a scheduling approach that can be used when the separation distance is between 100 and 200 km. Again, the communication frame 1370 is transmitted from the ground terminal 20, and in this specific example it is assumed that the separation is 150 km, and hence the delay in receiving the communication frame is 0.5 ms as shown by the line 1375. In this scenario, the cumulative timing advance that will applied after the RACH sign-up process has been completed will be 1 ms. As a result, it is possible to accommodate uplink allocations in either or both of sub-frames U1 and U2 without violating the downlink/uplink timing constraint, as indicated by the line 1380. As shown by the line 1385, uplink communications in either of those two sub-frames will then be correctly received by the ground terminal 20.

FIG. 17C illustrates a scheduling scheme that can be used when the separation distance is less than 100 km. The communication frame 1390 is transmitted from the ground terminal, and in this instance it is assumed that the separation delay is 0.17 ms, this assuming the separation distance is 50 km. In this instance, any of the three uplink sub-frames U0, U1 or U2 can be allocated for uplink communication, since the cumulative timing advance after the RACH process has been performed will be 0.33 ms.

As shown by the line 1400, if the sub-frame U0 is used, this will cause some overlap of the U0 sub-frame transmission timing with the S0 frame. However, the extent of overlap still leaves some gap, and in particular does not overlap with any symbols within the S0 sub-frame that will be used for downlink communication, and accordingly the receive/transmit timing constraint is not violated. Further, as shown by the line 1405, any uplink communication of the three sub-frames U0, U1 or U2 will be correctly received by the ground terminal with the appropriate timing.

It is anticipated that the traffic between an aircraft and a connected ground terminal will be heavily downlink centric, for example to support the earlier-mentioned Wi-Fi connectivity for passengers within the aircraft. As will be apparent from the earlier-discussed frame format of FIG. 2, when using that frame format three sub-frames are reserved for uplink communication. This is required to allow for effective scheduling of uplink communications for aircrafts up to 300 km away from the ground terminal. However, in one example implementation the base station may be provided with the flexibility to alter the communication frame format under certain conditions, in order to allow for a larger proportion of the communication frame to be used for downlink traffic when possible.

Figure 18:
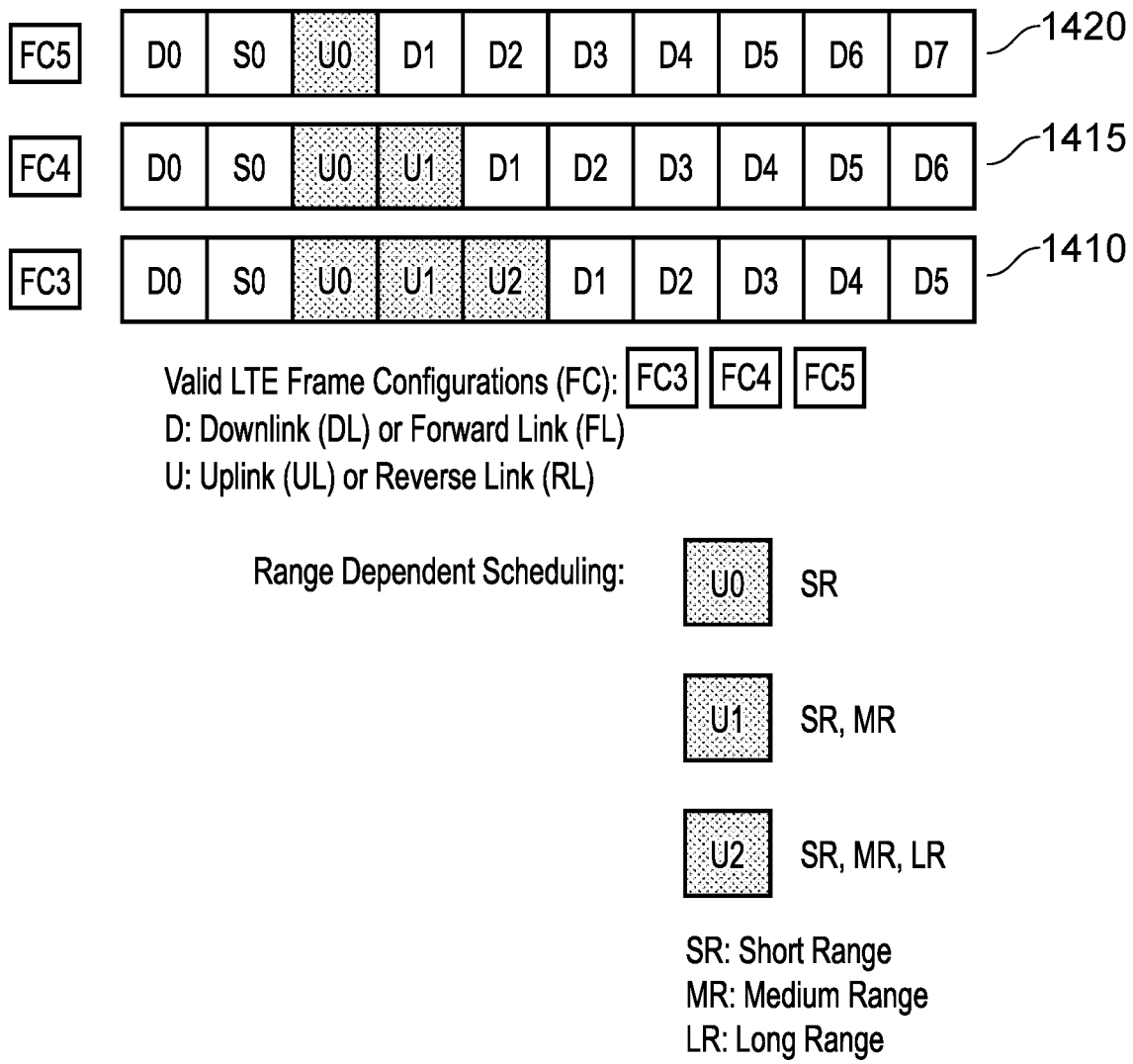
FIG. 18 illustrates multiple communication frame formats that can be supported in one example implementation.

FIG. 18 illustrates three example communication frame formats that may be used, each of which are supported LTE TDD (Time Division Duplex) frames. The frame format FC3 1410 is the format discussed earlier with reference to FIG. 2. The format FC4 1415 has one less uplink sub-frame and one more downlink sub-frame. Further, the frame format FC5 1420 has only a single uplink sub-frame, and an additional downlink sub-frame relative to the frame format FC4.

From the earlier scheduling examples illustrated with reference to FIGS. 17A to 17C, it will be appreciated that it is only when the separation distance exceeds 200 km (referred to in FIG. 18 as long range (LR)) that there is a need to schedule uplink communication in the last of the three uplink sub-frames, and hence the requirement to use communication frame FC3. When the distance is between 100 and 200 km (referred to in FIG. 18 as medium range (MR)), then uplink communication can be scheduled in the second uplink sub-frame, and hence it would still be possible to schedule uplink communications even if the communication frame format FC4 was used. Similarly, it will also be appreciated that if the communication frame format FC4 is used, uplink communication with aircraft up to 100 km away (referred to in FIG. 18 as short range (SR)) can also be accommodated when using the communication frame format FC4.

Finally, it will be appreciated that if the aircraft is less than 100 km away, then the communication frame format FC5 could be used, since uplink communication can be scheduled in the first uplink sub-frame (which happens to be the only uplink sub-frame in the frame format FC5).

Figure 19:
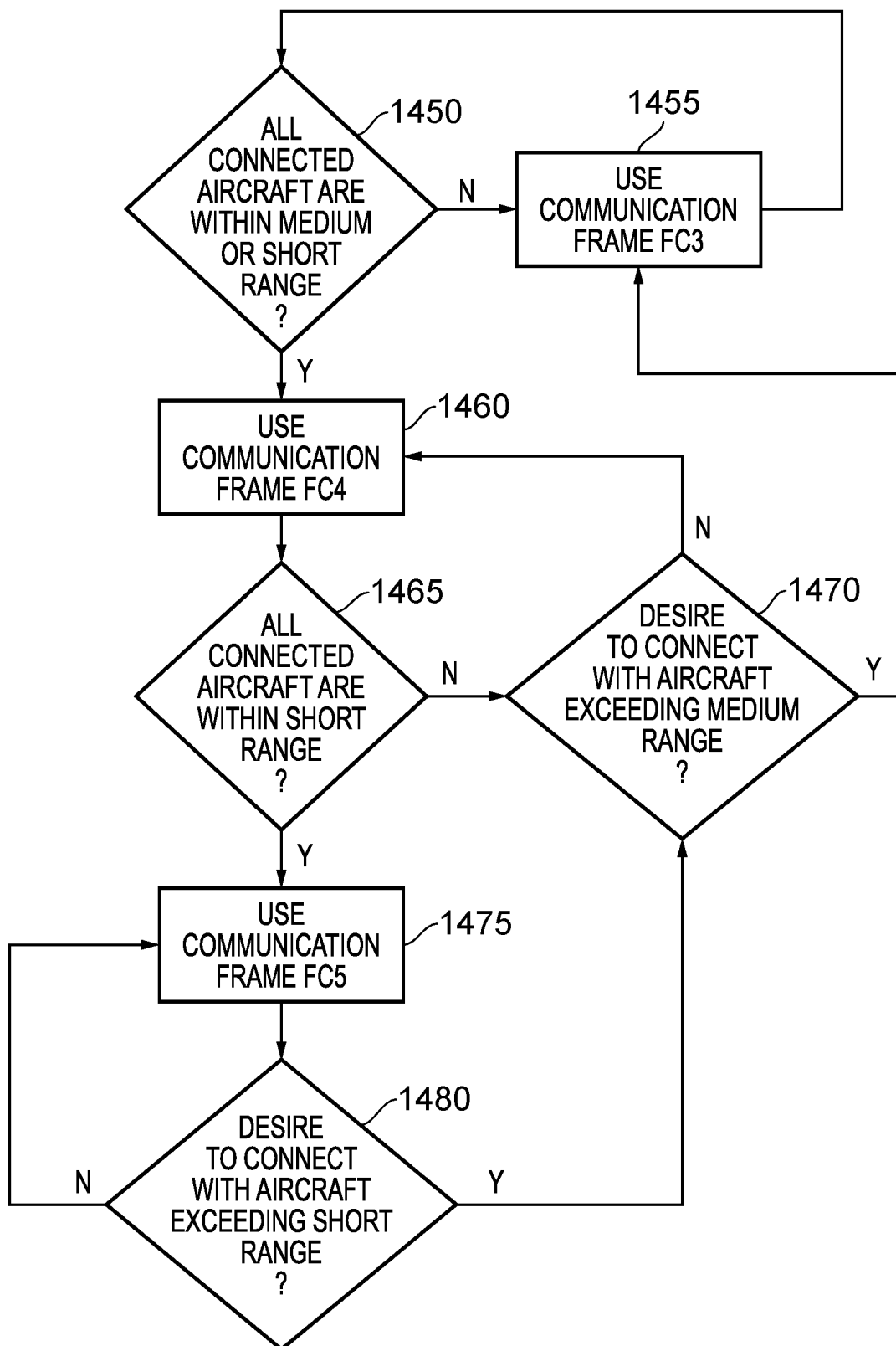
FIG. 19 is a flow diagram illustrating how the ground terminal in one example implementation can switch between the communication frame formats of FIG. 18 as separation distances permit, in order to seek to increase the proportion of the communication frame available for downlink communications.

FIG. 19 is a flow diagram illustrating how the ground terminal could make use of the three communication frame formats shown in FIG. 18 in order to facilitate a higher downlink capacity when the location of the connected aircrafts permits. At step 1450, it is determined whether all of the aircraft connected to that ground station are within the medium or short ranges. If not, then the communication frame FC3 is used at step 1455, and the process returns to step 1450.

However, if all of the connected aircraft are within the medium or short range, then the process can proceed to step 1460 where the aircraft terminal can switch to using communication frame FC4. A broadcast signal can be sent from the ground terminal to all of the connected aircraft terminals to advise them of the change in the communication frame. Once step 1460 has been implemented, it will be appreciated that there is an additional downlink sub-frame available when compared with the communication frame FC3.

Following step 1460, it can be determined at step 1465 whether all connected aircraft are within the short range. If not, it is then determined at step 1470 whether there is a desire to connect with an aircraft exceeding the medium range. For example, the ground terminal may receive a RACH signal from an aircraft within the long range seeking to establish a connection, and the ground terminal may decide that it wishes to service that request. Alternatively, it may be known that one of the already connected aircraft is about to leave the medium range into the long range, and it may be desirable to maintain connection with that aircraft. If it is determined at step 1470 that there is desire to connect with an aircraft exceeding the medium range, then the process proceeds to step 1455 where a switch is made to using the communication frame FC3. Again, a broadcast signal can be sent from the ground station to identify this change in the communication frame.

However, if at step 1470 it is determined that there is no desire to connect with an aircraft exceeding the medium range, then the process can merely return to step 1460.

If at step 1465 it is determined that all of the connected aircraft are within the short range, then the process can proceed to step 1475 where the communication frame FC5 can be used. Again, a broadcast signal can be sent from the ground terminal to advise of the change in the communication frame format.

Following step 1475, it can be determined at step 1480 whether there is a desire to connect with an aircraft exceeding the short range. If not, the process merely returns to step 1475 where the communication frame format FC5 continues to be used. However, if at step 1480 it is determined that there is a desire to connect with an aircraft exceeding the short range, then the process proceeds to step 1470 where the earlier-discussed analysis is performed.

Accordingly, by such an approach, it can be seen that the ground terminal can make use of multiple communication frame formats so as to seek to maximum the downlink capacity available, taking into account the separation between that ground terminal and the relevant aircraft. This can further improve capacity within the network.

In one example implementation where lookup tables are used to determine initial timing advances to be applied for RACH signals, those lookup tables can be updated as necessary dependent on the communication frame format currently being employed by the ground terminal.

From the above described examples, it will be seen that the techniques described herein enable for a timing adjustment to be made within a wireless communication system for a moving vehicle to enable wireless links to be established between the moving vehicle and a ground terminal, even when the separation distance between the moving vehicle and the ground terminal exceeds the maximum separation distance supported by the sign-on procedure when using the wireless communication Standard provided within the wireless network. Further, once such a link has been established, the scheduling of uplink resource to the aircraft can be adapted so as to ensure that receive/transmit timing constraints are not violated, even in situations where the separation distance exceeds the maximum separation distance supported by the telecommunications Standard.

In the above described examples, adjustments to the frequency or timing of signals transmitted by a vehicle terminal of a moving vehicle are calculated by circuitry within the vehicle terminal itself. However, the inventors realised that in some situations it may be beneficial not to implement such mechanisms within the vehicle terminal itself, but instead to use a centralised mechanism to perform such computations. This will allow, for instance, computations to be made for base stations to which the moving vehicle is not currently connected, for example to assist in the handover procedure. Moreover, even if the above techniques are implemented, it may be beneficial to employ an additional mechanism to aid the above technique. The following examples provide such a mechanism.

Figure 20:
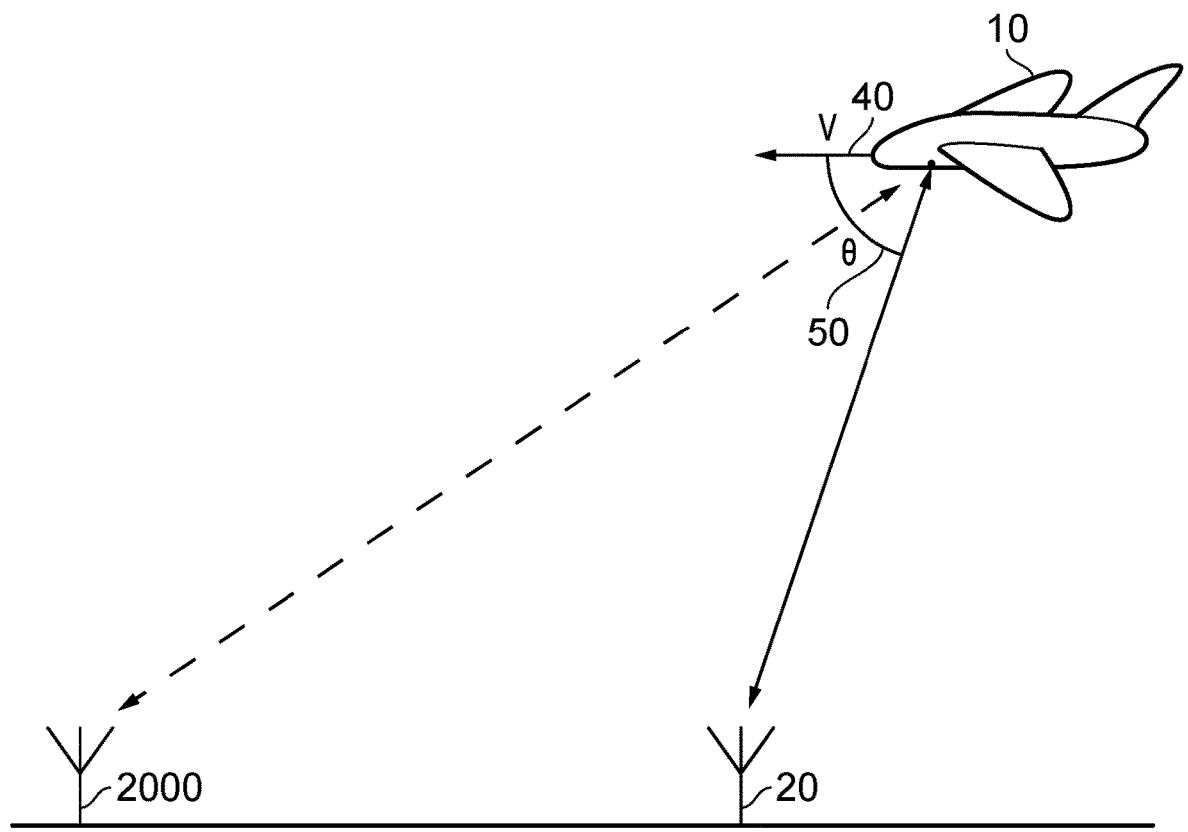
FIG. 20 is a diagram schematically illustrating air-to-ground (ATG) communication between an aircraft and a ground station, and a selected other ground station for communication to be transitioned to during a handover procedure.

Similarly to FIG. 1, FIG. 20 shows an aircraft 10 in communication with a base station (ground terminal) 20, and travelling at a velocity 40, at a given angle 50 to a line connecting the vehicle and the base station. This base station 20 is the current base station, or connected base station, and is one of a network of base stations configured to communicate with the aircraft. Also shown in FIG. 20 is another base station 2000 of the network of base stations, that is not currently in communication with the aircraft. However, the other base station 2000 is a handover candidate for selection as the next base station to which the aircraft 10 will connect. When it is determined that a better signal quality will be achieved by switching to the other base station 2000, a handover procedure may be initiated to transfer communication with the vehicle terminal from the current base station 20 to the other base station 2000.

Figure 21:
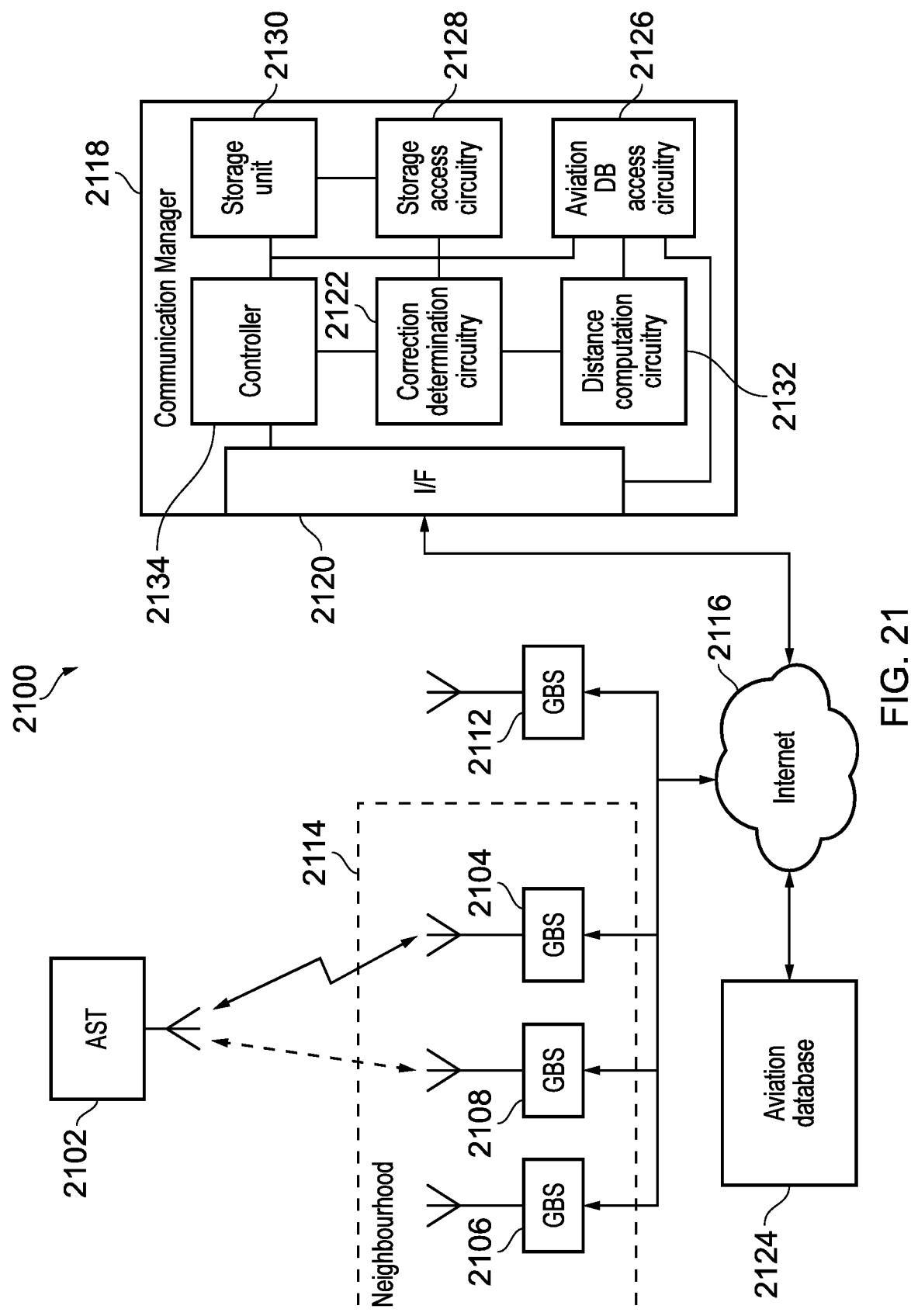
FIG. 21 is a block diagram schematically illustrating components of an air-to-ground (ATG) communication network.

As discussed above, the aircraft is provided with a vehicle terminal (also known as an air terminal or air station) for communication with the network of base stations on the ground. The vehicle terminal, the base stations and other components to be described herein, form a communication network. FIG. 21 shows some of the components that may be present in a communication network 2100 according to the present technique.

In the communication network 2100, an air terminal 2102 (also known as an air station or a vehicle terminal) is in communication with a current base station 2104. The current base station is one of a network of base stations 2104-2112, with some of the base stations in the network forming a neighbourhood 2114 of base stations. The base stations 2104-2108 in the neighbourhood 2114 are base stations which serve as potential candidates for a handover procedure to transfer the air terminal 2102 from the current base station 2104 to a selected other base station in the network. Which base stations form the neighbourhood 2114 may vary dependent on implementation, but may for example be determined with reference to the currently connected base station 2104. In some instances that default set of candidate base stations may be altered taking into account other information such as the direction of travel, and/or the bearing, of the aircraft.

In the example depicted in FIG. 21, one of the base stations 2108 has been selected as the next base station, and a handover procedure is thus expected to be performed to transfer communication with the air terminal 2102 from the current base station 2104 to the selected other base station 2108.

The base stations 2104-2112 are connected via a wired or wireless connection to the internet 2116.

Also shown in the communication network 2100 depicted in FIG. 21 is a communication manager 2118 for managing communication between the base stations 2104-2112 and the air terminal 2102 in the communication network 2100.

The communication manager 2118 comprises a controller 2134 responsible for controlling the communication manager 2118 and an interface 2120 for transmitting and receiving signals to or from the rest of the network. For example, the current base station 2104 may send offset measurement information indicative of measured differences between the expected timing and frequency of signals received at the base station 2104, and the actual timing and frequency of the received signals. The current base station 2104 transmits this offset information via the internet 2116 to the interface 2120. However, it should be noted that in other examples, offset information is not transmitted to the interface 2120 from the current base station 2104. This is discussed in more detail below, with reference to FIGS. 23 to 27.

The communication manager also includes correction determination circuitry 2122 for calculating frequency and/or timing correction information for signals to be transmitted from the air terminal 2102 to the base stations 2104-2108 in the neighbourhood 2114.

The correction determination circuitry 2122 is configured to determine the timing and/or frequency corrections based on information about the base stations 2104-2108 and the aircraft. For example, the correction determination circuitry is configured to obtain vehicle tracking information from an aviation database 2124, accessed by aviation database access circuitry 2126 via the internet 2116 and the interface 2120. The vehicle tracking information may include a location and velocity of the aircraft in which the air terminal 2102 is installed. Meanwhile, location information about each base station 2104-2108 in the neighbourhood 2114 can be determined by accessing, via storage access circuitry 2128, a storage unit 2130, using a base station identifier as an input.

Using the vehicle tracking information and the base station location information, distance computation circuitry 2132 is configured to determine a separation distance (scalar or vector) between the air terminal 2102 and each of the base stations 2104 to 2108. Based on this information, the correction determination circuitry 2122 is configured to calculate, using the Doppler formula discussed above, frequency corrections to be applied to signals to be transmitted from the air terminal 2102 to the base stations 2104-2108 in the neighbourhood 2114. The correction determination circuitry 2122 is also arranged to determine timing corrections to be applied to those signals, in dependence on the calculated separation distance.

While the above example describes calculating frequency and timing correction information (transmission adjustment control information) for all of the base stations 2104-2108 in the neighbourhood 2114, it will be noted that in some examples transmission adjustment control information is only determined for those base stations 2106, 2018 of the neighbourhood 2114 that are not currently in communication with the air terminal (e.g. the handover candidates).

Furthermore, when transmission adjustment control information is calculated for the current base station 2104, it may be calculated in any of a number of different ways. One example is to use the technique described above, using vehicle tracking information and base station location information. However, in some examples, the interface is configured to pass received offset information from the connected base station to the correction determination circuitry 2122. The correction determination circuitry 2122 then uses the offset information to determine frequency and/or timing adjustment information to be applied to signals transmitted from the air terminal 2102 to the connected base station 2104. For example, the correction determination circuitry 2122 may receive offset information for a plurality of signals received by the current base station 2104 and calculate a filtered adjustment estimate. This is expanded on below, when discussing FIGS. 23 to 27.

Regardless of the technique by which the transmission adjustment control information is determined, and regardless of which base stations 2104-2108 the information is calculated for, the information is passed to the controller 2134, which either passes it onto the interface 2120 for transmission to the current base station 2104 or one of the non-connected base stations 2106, 2108, or passes it onto the storage unit 2130 to be stored for later use. Once the transmission adjustment control information is received by the current base station 2104, it is further transmitted to the air terminal 2102, which applies the calculated frequency and/or timing adjustment to signals it transmits. The transmission adjustment control information relating to other base stations in the neighbourhood 2114 may further be transmitted to those base stations, for use during handover of the air terminal 2102 to one of those base stations.

Thus, according to the above example, frequency and/or timing correction information is determined in a communication manager 2118 on the ground, rather than in the air terminal 2102. This can improve compatibility of the system with existing air terminals 2102 and base stations 2104-2112, which may not have the capability to calculate the adjustment information themselves.

The above example can also be applied in addition to mechanisms by which frequency or timing corrections are determined by circuitry in the air terminal 2102. In this case, the correction determination circuitry may determine a correction which is relative to another correction already applied by the air terminal 2102 (relative adjustment control information). Alternatively (or in the case where the air terminal 2102 does not calculate any correction information itself), the correction determination circuitry 2122 may determine a correction which as an absolute correction, to be applied to a signal as generated by the air terminal 2102.

Figure 22:
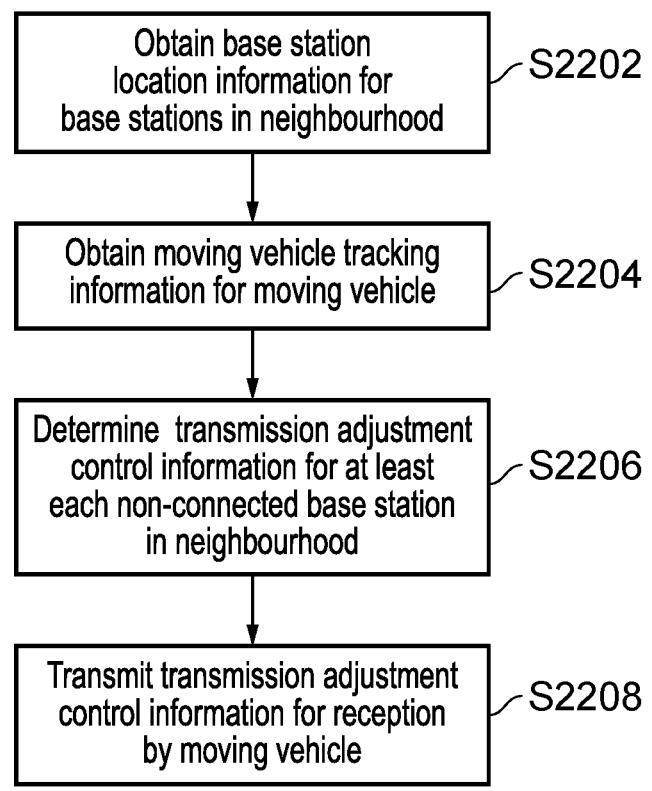
FIG. 22 is a flow diagram illustrating an example of a method of determining and transmitting transmission adjustment control information.

FIG. 22 is a flow diagram showing an overview of a method carried out by the correction determination circuitry 2122 of FIG. 21 to determine transmission adjustment control information for base stations 2104-2108 in the neighbourhood 2114.

In step S2202, base station location information for base stations 2104-2108 in the neighbourhood is obtained. As discussed above, this information may be obtained by accessing, with storage access circuitry 2128, a storage unit 2130 using at least one base station identifier.

In step S2204, moving vehicle tracking information of the moving vehicle is obtained. For example, this could be achieved by accessing an external aviation database 2124 (in the case where the vehicle is an aircraft).

In step S2206, transmission adjustment control information is determined for at least each non-connected base station 2106, 2108 in the neighbourhood 2114. As discussed above, the transmission adjustment control information may be frequency adjustment information indicative of a frequency adjustment to be applied by the aircraft to a transmission frequency of a signal, so as to reduce a frequency difference between an observed frequency of the signal at the selected base station and a predetermined uplink frequency, and/or it may be timing adjustment information indicative of a timing adjustment to be applied to a transmission time of the signal, so as to reduce a timing difference between a reception timing of the signal at the selected base station and an expected timing. The timing correction may refer to a correction to be applied to various signals, for example a RACH signal as described above with reference to FIGS. 12A and 12B, or more generally to support uplink scheduling as discussed in FIGS. 16A to 18.

Once the transmission adjustment control information has been determined it may be transmitted, in step S2208, for reception by the vehicle terminal in the moving vehicle. Referring back to FIG. 21, the transmitted adjustment control information is transmitted by the interface 2120 of the communication manager 2118 to the current base station 2104, to be transmitted to the vehicle terminal (the air terminal 2102 in FIG. 21). Whilst all of the generated adjustment control information can be transmitted if desired, in some instances only a subset of the generated information will be transmitted, for example that related to a selected base station to which it has been decided to perform a handover procedure.

Figure 23:
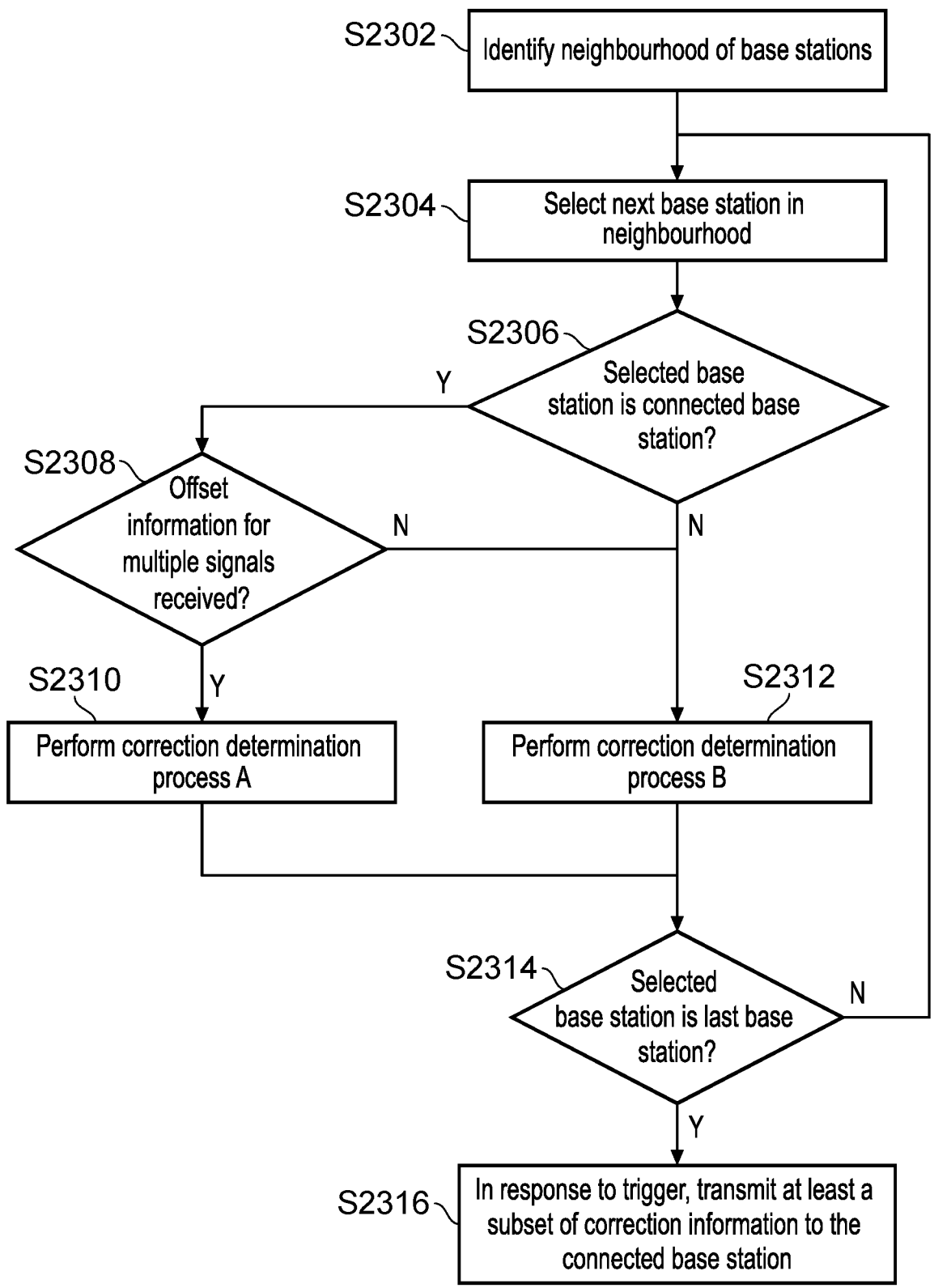
FIG. 23 is a flow diagram illustrating a process for determining and transmitting transmission adjustment control information for a network of base stations.

A more detailed example of a method of determining transmission adjustment control information is illustrated in FIG. 23. This method may, for example, be carried out in the communication manager 2118 of FIG. 21.

In step S2302, the neighbourhood of base stations 2114 is identified. The neighbourhood 2114 may be identified in any of a number of ways. For example, the neighbourhood 2114 may be defined as all of the available base stations within a given distance of the current base station 2104. Alternatively, the selection of base stations to be included within the neighbourhood 2114 may be narrowed down further, based on other factors such as the bearing of the vehicle.

Once the neighbourhood 2114 of base stations has been identified, in step S2304 the next base station in the neighbourhood 2114 is selected. The selection of the "next" base station may be performed by any applicable method; for example, the next base station may be selected randomly, or it may be the base station with the next base station identifier in a chronological order.

Whichever method is used to select the next base station, once it is selected, the method proceeds to step S2306, in which it is determined whether or not the selected base station is the connected (i.e. current) base station 2104.

If, in step S2306, it is determined that the selected base station is the current base station 2104, a determination S2308 is made as to whether or not offset information has been received for more than one signal. If the answer at this step is "yes," the method proceeds to step S2310, and correction determination process A (to be discussed later with reference to FIGS. 24 to 25) is performed. On the other hand, if the answer at this stage is "no," the method proceeds instead to step S2312 and correction determination process B (to be discussed later with reference to FIGS. 26 to 27) is performed.

Returning to step S2306, if it is instead determined at this stage that the selected base station is not the connected base station, the method proceeds to step S2312 and correction determination process B is carried out.

Following the implementation of either correction determination process, the method proceeds to step S2314, in which it is determined whether the selected base station is the last base station in the neighbourhood 2114. If the selected base station is not the last base station, the method returns to step S2304 and repeats for the next base station. On the other hand, if the selected base station is the last base station, the method proceeds to step S2316.

In step S2316, in response to a trigger being detected, at least a subset of the correction information is transmitted to the current base station 2104, for further transmission to the vehicle terminal. The trigger may take a variety of forms. For example, the trigger could be a specific request transmitted to the communication manager by the current base station. Alternatively, the trigger may simply be a determination that the correction information for all of the base stations in the neighbourhood 2114 has been determined, or it may be the passage of a predetermined period of time.

Whatever the trigger, the correction information may be stored in the storage unit 2130 in the communication manager 2118 before it is transmitted. This is illustrated in FIGS. 24 to 27.

Correction determination processes A and B will now be discussed with reference to FIGS. 24 to 27.

Figure 24:
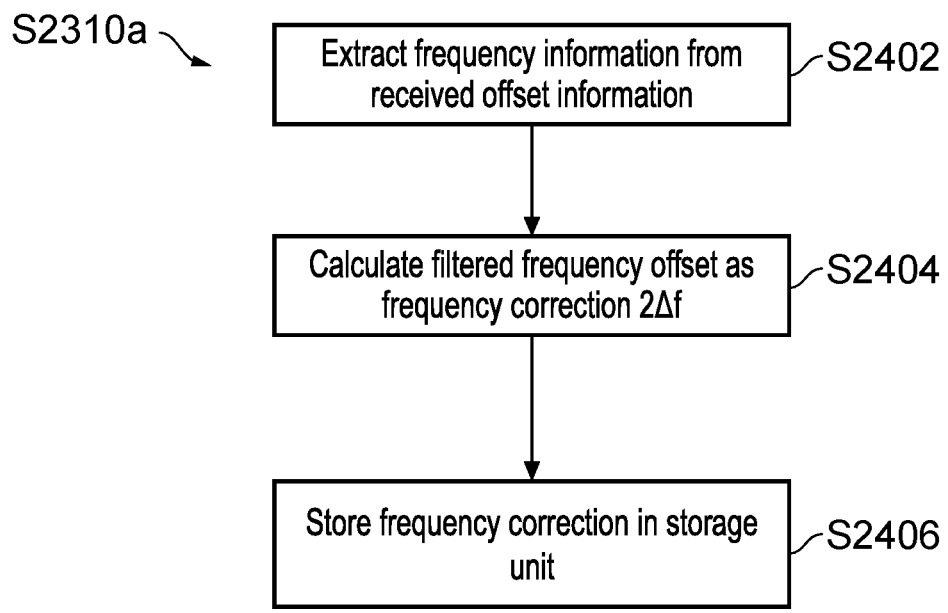
FIGS. 24 to 27 are flow diagrams illustrating processes for determining frequency correction information for a given base station.

FIG. 24 is a flow diagram illustrating correction determination process A in a case where the correction information to be determined is frequency correction information. As discussed earlier, with reference to FIG. 23, this process S2310a requires offset information for at least two signals to be received by the communication manager 2118, and can only be applied to the current base station 2104.

Correction determination process A starts with a step S2402 of extracting, from the received offset information for the two or more signals, frequency information. The frequency information is information indicative of a difference between an observed frequency of each of the plurality of signals received at the current base station and a predetermined uplink frequency of that previous signal.

Then, in step S2404, the frequency correction 2Δf to be applied to signals transmitted by the vehicle terminal is determined by filtering the received offset information.

Finally, once the frequency correction has been determined, it is stored at step S2406 in the storage unit 2130.

It is noted that the filtered offset information does not need to be doubled in order to obtain the frequency correction of 2Δf. Signals received at the air terminal are offset by Δf due to the Doppler effect on those downlink signals, so that signals received at the base station are offset by an additional Δf, giving them a 2Δf offset overall. Thus, the "double" is already incorporated in the offset information used to determine the frequency correction.

Figure 25:
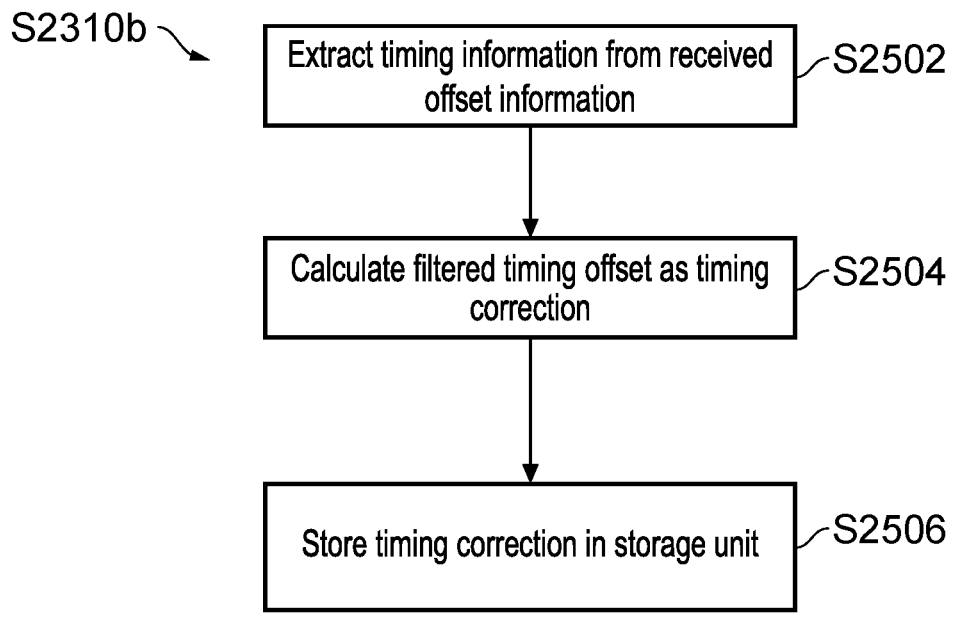

FIG. 25 is a flow diagram illustrating a related process S2310b to be applied where the correction information to be determined is timing correction information. As with FIG. 24, this process S2310b requires offset information for at least two signals to be received by the communication manager 2118, and can only be applied when the selected base station is the connected base station.

In this case, correction determination process A starts with a step S2502 of extracting, from the received offset information for the two or more signals, timing information. The timing offset information is information indicative of a difference between a reception timing of each of the plurality of previous signals at the current base station and an expected timing for that previous signal.

Then, in step S2504, the timing correction to be applied to signals transmitted by the vehicle terminal is determined by filtering the received offset information.

Finally, once the timing correction has been determined, it is stored at step S2506 in the storage unit 2130.

It should be noted that, while frequency corrections and timing corrections have been described as separate processes, it is also possible for frequency and timing corrections to be calculated together. For example, process A can be performed for both timing and frequency corrections at the same time, by extracting both frequency information and timing information together in steps S2402 and S2502 and using both sets of information to compute filtered estimates of the corrections.

Figure 26:
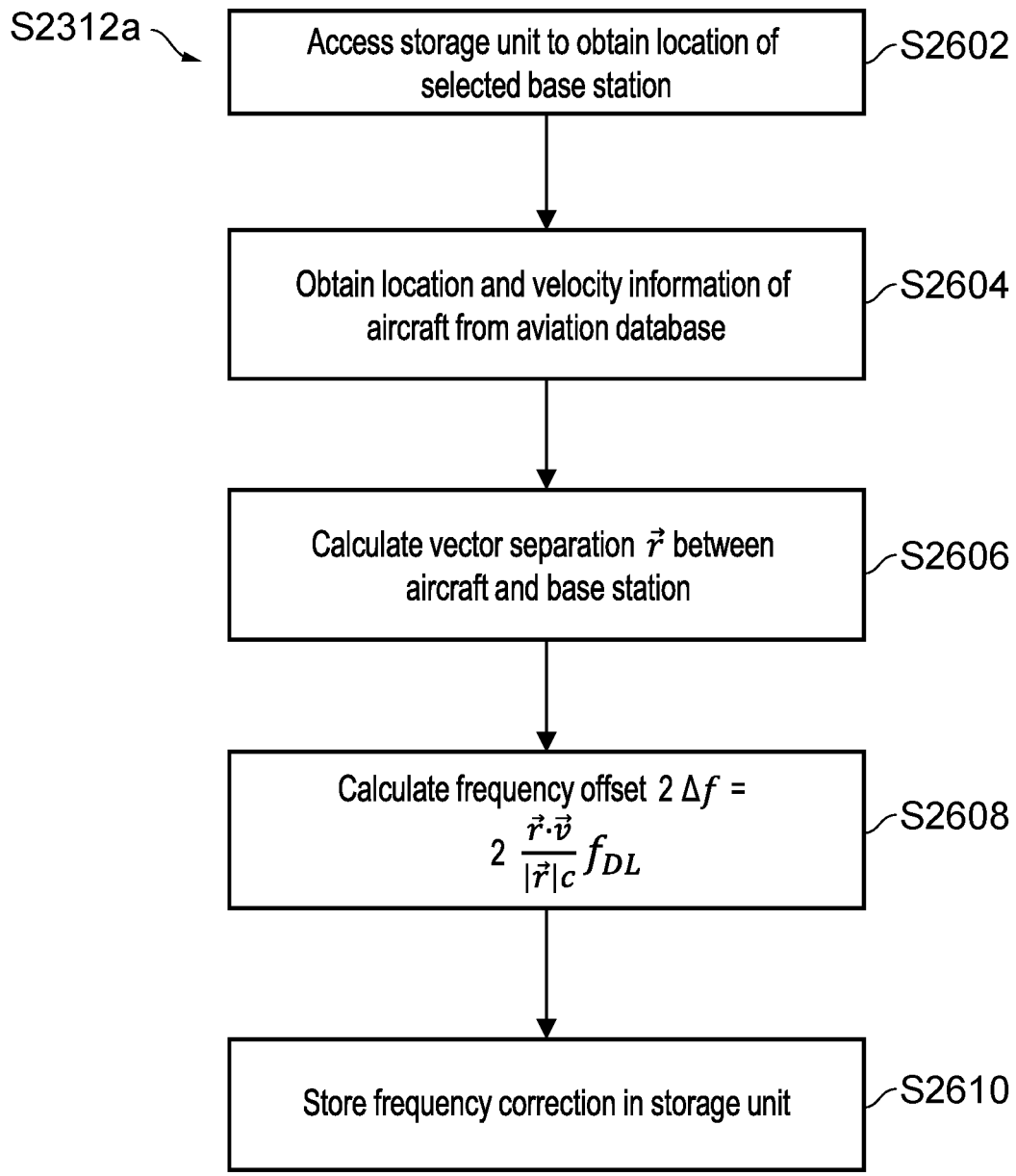

FIG. 26 is a flow diagram illustrating correction determination process B in a case where the correction information to be determined is frequency correction information. As discussed above with reference to FIG. 23, this process S2312a can be applied to any of the base stations in the neighbourhood 2114, regardless of whether or not offset information has been received by the communication manager 2118.

Correction determination process B starts with a step S2602 of accessing the storage unit 2130 (for example, using the storage access circuitry 2128) to obtain location information of the selected base station. The storage unit 2130 may be accessed using the identifier of the selected base station, for example.

In step S2604, location and velocity information (vehicle tracking information) of the moving vehicle (an aircraft, in this example) is obtained from an external database, such as an aviation database 2124.

Using the base station location information and the vehicle location information, a vector separation r between the moving vehicle and the selected base station is determined in step S2606. This step may, for example, be carried out by distance computation circuitry 2132.

In step S2608, the frequency offset 2Δf is calculated using the vector separation r and the velocity v of the vehicle. The offset 2Δf is calculated according to the Doppler formula, as in the examples discussed above:

$$\Delta f^{FL} = \frac{r \cdot v}{|r|c} f_c^{FL}$$

where the offset 2Δf is double the value calculated from the above formula.

Finally, once the frequency correction information has been calculated, it is stored at step S2610 in the storage unit 2130.

Figure 27:
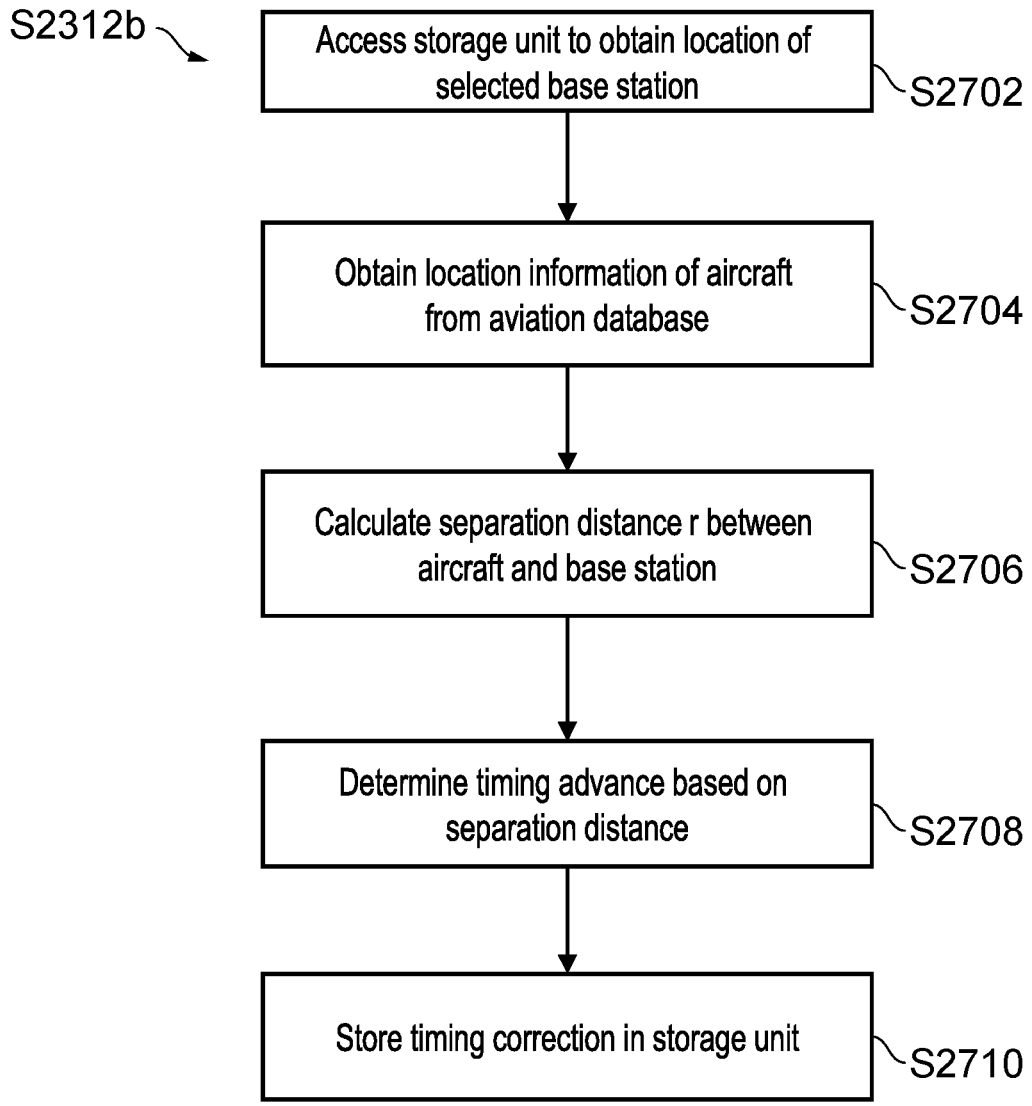

FIG. 27 is a flow diagram illustrating correction determination process B in a case where the correction information to be determined is timing correction information. As discussed above with reference to FIG. 23, this process S2312b can be applied to any of the base stations in the neighbourhood 2114, regardless of whether or not offset information has been received by the communication manager 2118.

Correction determination process B starts with a step S2702 of accessing the storage unit 2130 to obtain location information of the selected base station.

In step S2704, location information of the moving vehicle is obtained from an external database, such as an aviation database 2124.

Using the base station location information and the vehicle location information, a (scalar) separation distance r is determined in step S2706. This step may, for example, be carried out by distance computation circuitry 2132.

In step S2708, the timing offset is calculated based on the separation distance r, using for example the process discussed earlier with reference to FIG. 14.

Finally, once the timing correction information has been calculated, it is stored at step S2710 in the storage unit 2130.

As described above, FIGS. 24 to 27 all show examples of correction determination processes A and B. As depicted in FIG. 23, once either of these processes has been completed, it is determined, in step S2314, whether the selected base station is the last base station. If so, the method then proceeds to step S2316, and in response to a trigger, at least a subset of the transmission adjustment control information stored in the storage unit 2130 is transmitted to the connected base station 2104.

It should be noted that, while process A and process B have been described separately, it is also possible for the two processes to be combined, in order to provide more accurate estimates of the timing or frequency corrections.

Figure 28:
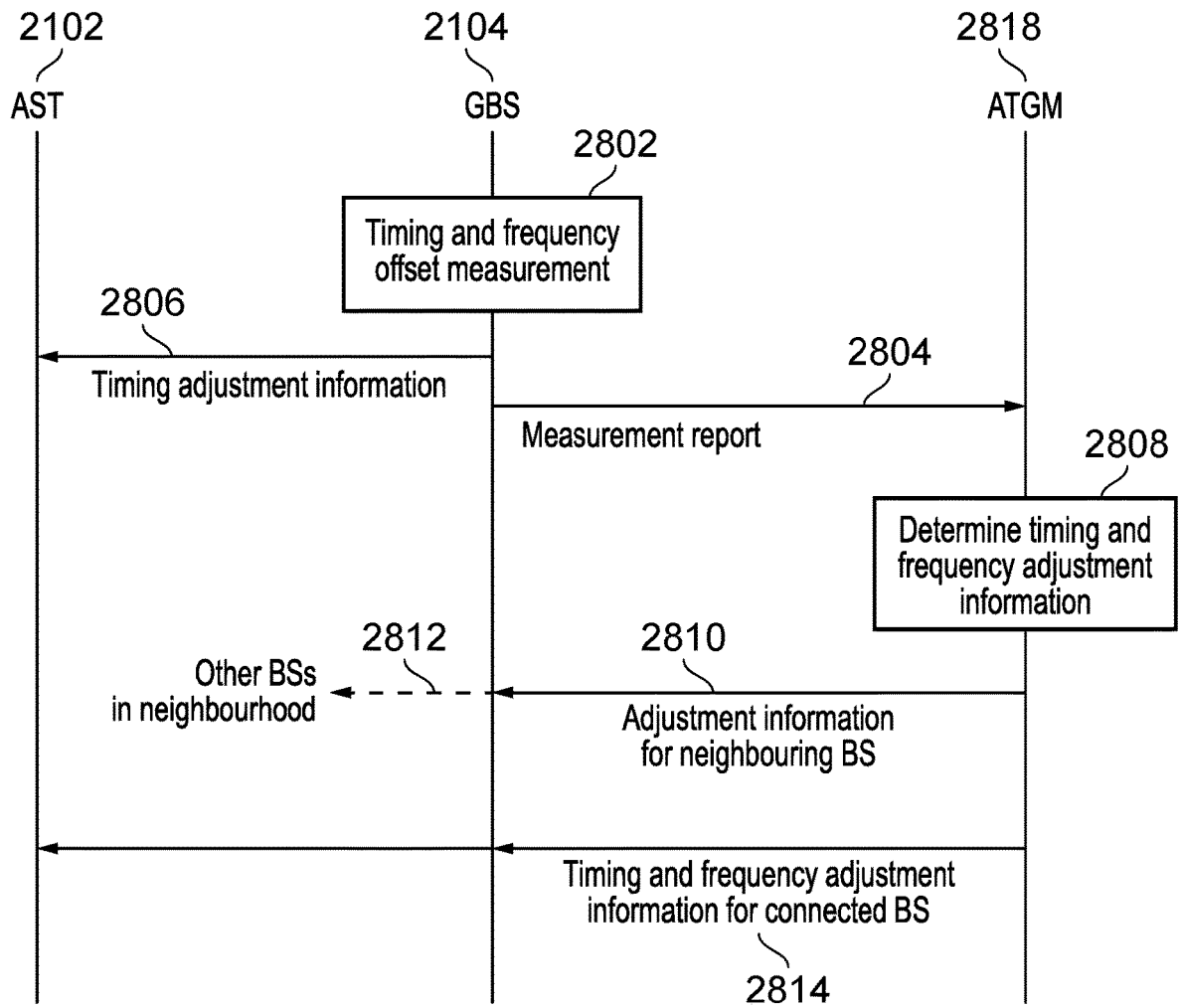
FIG. 28 is a timing diagram illustrating signals passed between an air terminal (AST), its connected base station (GBS) and an air-to-ground manager (ATGM)

According to the examples described above, a number of signals and messages are passed between the components of the communication network 2100. FIG. 28 is a timing diagram illustrating some of these messages.

In FIG. 28, messages passed between an air terminal 2102, a base station 2104 that is currently in communication with the air terminal 2102 and an air-to-ground manager (ATGM) 2818 (an example of the communication manager 2118 depicted in FIG. 21) are illustrated.

The current base station (connected base station) 2104 receives communication signals (not shown) transmitted by the air terminal. From these signals, the base station 2104 is able to calculate timing and frequency offsets 2802 between expected values and measured values of timing and frequency of received signals. Once these measurements have been made by the base station for one or more received signals, timing adjustment information 2806 may be transmitted to the air terminal 2102.

In addition, the timing and frequency measurements may be transmitted to the ATGM 2818 as a measurement report 2804. The measurement report 2804 may be sent to the ATGM 2818 in response to a request from the ATGM 2818, or it may be sent periodically, at predetermined time intervals. Alternatively, the measurement report may be transmitted every time a signal is received by the base station 2104 from the air terminal 2102. It should be noted that the measurement report may only comprise offset measurements for one of frequency and timing, or it may comprise offset measurements for both.

Once it has received the measurement report 2804, the ATGM 2818 is configured to determine timing and/or frequency adjustment information 2808 according to any of the techniques described above. The ATGM 2818 is then configured—either automatically or in response to a trigger—to transmit adjustment information 2810 relating to other, non-connected base stations in the neighbourhood to the connected base station 2104. The connected base station 2104 may retain this information for its own use—for example, for use in determining a handover candidate—or it may pass on a portion of the adjustment information 2812 to other base stations in the neighbourhood. In particular, the current base station 2104 may transmit adjustment information relating to a particular other base station to that base station. It should be noted that, although FIG. 28 shows the adjustment information for non-connected base stations being transmitted to the connected base station 2104, it might instead be transmitted directly to the non-connected base stations from the ATGM 2818.

The ATGM 2818 also transmits timing and adjustment information 2814 for the connected base station 2104 to the base station 2104. This information is then transmitted by the base station 2104 to the air terminal 2102. This allows the air terminal 2102 to use the adjustment information to adjust the frequency and/or timing of signals it transmits to the connected base station 2104.

Figure 29:
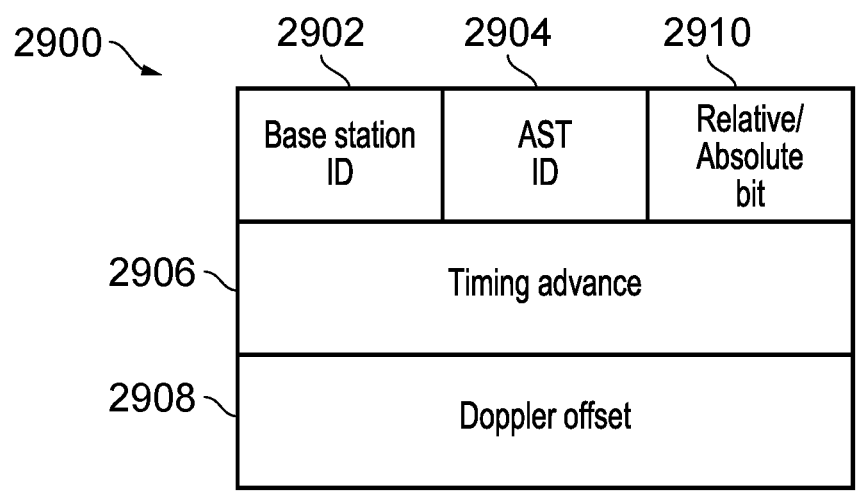
FIG. 29 is a diagram schematically illustrating the fields of an IP packet used to transmit signals within an air-to-ground (ATG) communication network.

FIG. 28 depicts multiple signals transmitted within the communication network 2100. FIG. 29, meanwhile, depicts an example of the form these messages might take.

FIG. 29 depicts an IP (Internet Protocol) packet 2900. The IP packet 2900 has a plurality of fields, including a base station ID field 2902 for storing an identifier of a base station; in particular, the base station identified in the base station ID field 2902 may be a base station to which the packet 2900 is being transmitted, or from which it is being received.

The IP packet also comprises an AST ID field 2904, for storing an identifier of an air terminal (or a vehicle terminal if the system is not an ATG system). In particular, the air terminal identified in the AST ID field 2904 is the terminal for which the timing and/or Doppler corrections (also included in the packet 2900) have been determined. That is, the air terminal identified is the ultimate destination for the packet.

The packet 2900 includes a timing advance field 2906 for storing the calculated timing adjustment information for the identified air terminal, and a Doppler offset field 2908, for storing the calculated frequency adjustment information for the identified air terminal.

Finally, the packet comprises a relative/absolute field 2910, for storing a relative/absolute bit for identifying whether the timing and frequency adjustment information is relative adjustment information or absolute adjustment information.

The advantage of transmitting messages in the communication network 2100 using an IP packet 2900 as illustrated in FIG. 29, is to ensure compatibility of the mechanisms of the present technique with existing Standards. This ensures that the system can be more easily deployed and integrated into existing systems.

In the examples described above, transmission adjustment control information is determined for an air terminal, in relation to a number of base stations in a neighbourhood of nearby base stations. The transmission adjustment control information includes frequency adjustment information and/or timing adjustment information to be applied by signals transmitted by the air terminal. The frequency adjustment information indicates a frequency correction to be applied to the transmitted signals in order to account for a frequency offset in the signals caused by the Doppler effect. The timing adjustment information indicates a timing correction to be applied to the transmitted signals to reduce a timing offset in the signals caused by the distance over which the signals need to travel. In particular, the timing offset may relate to a connection setup (RACH) signal, which is expected to be received in a particular sub-frame in a given communication frame.

In some of the above examples, the transmission adjustment control information is computed centrally, in a communication manager on the ground. This enables transmission adjustment control information for base stations not currently in communication with the air terminal to be calculated, which allows a handover procedure transitioning communication from the current base station to another base station to be carried out more smoothly. Performing the calculation centrally also allows the system to be implemented without requiring alterations to be made to existing air terminals and base stations. This allows the present technique to be implemented such as to be compatible with existing systems and current Standards, with minimal impact to existing users.

While the present techniques have largely been described in terms of an air terminal installed in an aircraft, it will be appreciated that this is just one example of a situation in which the present technique may be implemented. The above described examples apply equally to a communication system in any moving vehicle, for example a high speed train. However, it is also noted that the present technique is particularly beneficial in air-to-ground systems, due to the high speeds with which aircraft travel, and the large distances between base stations on the ground.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus comprising:
base station location identifying circuitry to obtain base station location information for a plurality of base stations that provide a wireless network for communication with a moving vehicle, the plurality of base stations comprising a current base station connected with the moving vehicle and one or more other base stations, wherein the apparatus is at a location separate from the moving vehicle;
moving vehicle tracking circuitry to obtain moving vehicle tracking information for the moving vehicle;
correction determination circuitry to determine, based on the moving vehicle tracking information and the base station location information, transmission adjustment control information associated with each other base station; and
an interface configured to transmit, for reception by the moving vehicle, the transmission adjustment control information associated with at least a selected other base station, to enable the moving vehicle to adjust a signal transmitted to the selected other base station when a handover procedure is performed to transition communication with the moving vehicle from the current base station to the selected other base station,
wherein the transmission adjustment control information comprises at least one of:
frequency adjustment information indicative of a frequency adjustment to be applied to a transmission frequency of the signal, so as to reduce a frequency difference between an observed frequency of the signal at the selected other base station and a predetermined uplink frequency; and
timing adjustment information indicative of a timing adjustment to be applied to a transmission time of the signal, so as to reduce a timing difference between a reception timing of the signal at the selected other base station and an expected timing.

2. The apparatus of claim 1, wherein:
the transmission adjustment control information comprises absolute adjustment control information or relative adjustment control information, wherein:
the absolute adjustment control information comprises at least one of an absolute frequency adjustment and an absolute timing adjustment to be applied to the signal as generated by a terminal device of the moving vehicle; and
the relative adjustment control information comprises at least one of a relative frequency adjustment and a relative timing adjustment to be applied to the signal in addition to at least one of an existing frequency adjustment and an existing timing adjustment.

3. The apparatus of claim 1, wherein:
the moving vehicle tracking information comprises information indicative of a location and a velocity of the moving vehicle.

4. The apparatus of claim 3, wherein:
the interface is configured to receive, from the current base station, identification information of the moving vehicle; and
the moving vehicle tracking circuitry is configured to obtain the location and the velocity of the moving vehicle by accessing a tracking information database using the identification information of the moving vehicle.

5. The apparatus of claim 4, comprising distance computation circuitry configured to determine, for each other base station, separation information indicating a separation between the moving vehicle and that other base station based on the location of the moving vehicle and a location of that other base station.

6. The apparatus of claim 5, wherein:
the transmission adjustment control information comprises the frequency adjustment information;
the separation information identifies a vector separation; and
the correction determination circuitry is configured to determine the frequency adjustment information associated with each other base station based on the vector separation between the moving vehicle and that other base station and the velocity of the moving vehicle.

7. The apparatus of claim 5, wherein:
the transmission adjustment control information comprises the timing adjustment information; and
the correction determination circuitry is configured to determine the timing adjustment information associated with each other base station based on the separation between the moving vehicle and that other base station.

8. The apparatus of claim 1, wherein:
the base station location identifying circuitry is configured to identify the one or more other base stations with reference to a bearing of the moving vehicle.

9. The apparatus of claim 1, wherein:
the correction determination circuitry is configured to perform a process of determining further transmission adjustment control information associated with the current base station; and
the interface is configured to transmit, for reception by the moving vehicle, the further transmission adjustment control information, to enable the moving vehicle to adjust at least one further signal transmitted to the current base station.

10. The apparatus of claim 9, wherein:
the correction determination circuitry is configured to iteratively perform the process, to enable ongoing adjustment of signals to be transmitted by the moving vehicle to the current base station.

11. The apparatus of claim 9, wherein:
the interface is configured to receive offset information for a plurality of previous signals received at the current base station from the moving vehicle, the offset information comprising at least one of frequency offset information indicative of a difference between an observed frequency of each of the plurality of previous signals received at the current base station and a predetermined uplink frequency of that previous signal, and timing offset information indicative of a difference between a reception timing of each of the plurality of previous signals at the current base station and an expected timing for that previous signal; and the correction determination circuitry is configured to determine the further transmission adjustment control information based on the offset information.

12. The apparatus of claim 11, wherein the correction determination circuitry is configured to determine the further transmission adjustment control information by calculating a filtered estimate from the offset information received for the plurality of previous signals.

13. The apparatus of claim 5, wherein:

the correction determination circuitry is configured to perform a process of determining further transmission adjustment control information associated with the current base station;

the interface is configured to transmit, for reception by the moving vehicle, the further transmission adjustment control information, to enable the moving vehicle to adjust at least one further signal transmitted to the current base station;

the further transmission adjustment control information associated with the current base station comprises frequency adjustment information associated with the current base station;

the distance computation circuitry is configured to determine, for the current base station, a vector separation between the moving vehicle and the current base station based on the location of the moving vehicle and a location of the current base station; and the correction determination circuitry is configured to determine the frequency adjustment information associated with the current base station based on the vector separation between the moving vehicle and the current base station and the velocity of the moving vehicle.

14. The apparatus of claim 5, wherein:

the correction determination circuitry is configured to perform a process of determining further transmission adjustment control information associated with the current base station;

the interface is configured to transmit, for reception by the moving vehicle, the further transmission adjustment control information, to enable the moving vehicle to adjust at least one further signal transmitted to the current base station;

the further transmission adjustment control information associated with the current base station comprises timing adjustment information associated with the current base station;

the distance computation circuitry is configured to determine, for the current base station, further separation information indicating a separation between the moving vehicle and the current base station based on the location of the moving vehicle and a location of the current base station; and the correction determination circuitry is configured to determine the timing adjustment information associated with the current base station based on the separation between the moving vehicle and the current base station.

15. The apparatus of claim 1, wherein the interface is configured to transmit the transmission adjustment control information to the current base station, for reception by the moving vehicle.

16. The apparatus of claim 15, wherein the transmission adjustment control information is transmitted in an Internet Protocol (IP) packet comprising:

identification information of one of the plurality of base stations;

a relative bit indicative of whether the transmission adjustment control information comprises relative adjustment control information or absolute adjustment control information;

the transmission adjustment control information; and identification information of the moving vehicle.

17. The apparatus of claim 1, wherein the interface is configured to transmit the transmission adjustment control information associated with the selected other base station for reception by the selected other base station.

18. The apparatus of claim 17, wherein:

the transmission adjustment control information associated with the selected other base station comprises timing adjustment information associated with the selected other base station for enabling the selected other base station to determine a reception timing of the signal transmitted to the selected other base station when the handover procedure is performed to transition communication with the moving vehicle from the current base station to the selected other base station.

19. The apparatus of claim 1, wherein the moving vehicle is an aircraft.

20. A method comprising:

obtaining base station location information for a plurality of base stations that provide a wireless network for communication with a moving vehicle, the plurality of base stations comprising a current base station connected with the moving vehicle and one or more other base stations, wherein the method is performed at a location separate from the moving vehicle;

obtaining moving vehicle tracking information for the moving vehicle;

determining, based on the moving vehicle tracking information and the base station location information, transmission adjustment control information associated with each other base station; and transmitting, for reception by the moving vehicle, the transmission adjustment control information associated with at least a selected other base station, to enable the moving vehicle to adjust a signal transmitted to the selected other base station when a handover operation procedure is performed to transition communication with the moving vehicle from the current base station to the selected other base station, wherein the transmission adjustment control information comprises at least one of:

frequency adjustment information indicative of a frequency adjustment to be applied to a transmission frequency of the signal, so as to reduce a frequency difference between an observed frequency of the signal at the selected other base station and a predetermined uplink frequency; and timing adjustment information indicative of a timing adjustment to be applied to a transmission time of the signal, so as to reduce a timing difference between a reception timing of the signal at the selected other base station and an expected timing.

21. An apparatus comprising:

means for obtaining base station location information for a plurality of base stations that provide a wireless network for communication with a moving vehicle, the plurality of base stations comprising a current base station connected with the moving vehicle and one or more other base stations, wherein the apparatus is at a location separate from the moving vehicle;

means for obtaining moving vehicle tracking information for the moving vehicle;

means for determining, based on the moving vehicle tracking information and the base station location information, transmission adjustment control information associated with each other base station; and means for transmitting, for reception by the moving vehicle, the transmission adjustment control information associated with at least a selected other base station, to enable the moving vehicle to adjust a signal transmitted to the selected other base station when a handover operation procedure is performed to transition communication with the moving vehicle from the current base station to the selected other base station, wherein the transmission adjustment control information comprises at least one of:

frequency adjustment information indicative of a frequency adjustment to be applied to a transmission frequency of the signal, so as to reduce a frequency difference between an observed frequency of the signal at the selected other base station and a predetermined uplink frequency; and timing adjustment information indicative of a timing adjustment to be applied to a transmission time of the signal, so as to reduce a timing difference between a reception timing of the signal at the selected other base station and an expected timing.

* * * * *